US012325821B2

(12) United States Patent
Taylor et al.

(10) Patent No.: US 12,325,821 B2
(45) Date of Patent: Jun. 10, 2025

(54) LUBRICANT BLENDS AND METHODS FOR IMPROVING LUBRICITY OF BRINE-BASED DRILLING FLUIDS

(71) Applicant: Secure Specialty Chemicals Corp., Calgary (CA)

(72) Inventors: Matthew Taylor, Calgary (CA); Stuart Dubberley, Calgary (CA); Jay Nelson Brockhoff, Calgary (CA); Kuangbiao Ma, Calgary (CA)

(73) Assignee: SECURE SPECIALTY CHEMICALS CORP., Calgary (CA)

( * ) Notice: Subject to any disclaimer, the term of this patent is extended or adjusted under 35 U.S.C. 154(b) by 0 days.

(21) Appl. No.: 18/351,448

(22) Filed: Jul. 12, 2023

(65) Prior Publication Data
US 2024/0026204 A1  Jan. 25, 2024

Related U.S. Application Data

(60) Provisional application No. 63/388,519, filed on Jul. 12, 2022, provisional application No. 63/521,583, filed on Jun. 16, 2023.

(51) Int. Cl.
*C09K 8/08* (2006.01)
(52) U.S. Cl.
CPC ............ *C09K 8/08* (2013.01); *C09K 2208/34* (2013.01)
(58) Field of Classification Search
None
See application file for complete search history.

(56) References Cited

U.S. PATENT DOCUMENTS 2,462,810 A   2/1949  Ferguson
3,010,895 A   11/1961 McIntosh
(Continued)

FOREIGN PATENT DOCUMENTS

CA    2908698 C    11/2018
CN    1140742 A    1/1997
(Continued)

OTHER PUBLICATIONS

Otitigbe. (2021). Evaluation of pH of drilling fluid produced from local clay and additives. Journal of Applied Sciences and Environmental Management, 25(4), 561-566.
(Continued)

*Primary Examiner* — John J Figueroa
(74) *Attorney, Agent, or Firm* — Gowling WLG (Canada) LLP

(57) ABSTRACT

The present disclosure provides methods and lubricant blends for increasing lubricity of a brine-based drilling fluid having an alkaline pH and a threshold divalent cation concentration. An embodiment of the methods herein comprise providing a produced water or a brine having a threshold divalent cation concentration and an alkaline pH; adding to the produced water or brine at least one source of free fatty acids; and optionally further adding a dispersant. Also provided are brine-based drilling fluids produced by the methods and lubricant blends disclosed herein. Also, provided are methods for improving lubricity in a wellbore during drilling operations, which comprise, combining in a modulated manner, a quantity of a produced water or brine and a quantity of a lubricant blend comprising at least one source of free fatty acids and a dispersant, to target formation of a semi-solid lubricant that adheres to downhole surfaces.

21 Claims, 13 Drawing Sheets

(56) References Cited

U.S. PATENT DOCUMENTS

| | | |
|---|---|---|
| 3,047,494 A | 7/1962 | Browning |
| 3,415,320 A | 12/1968 | Young |
| 3,634,235 A | 1/1972 | Wilson et al. |
| 3,682,821 A | 8/1972 | Kolaian |
| 3,697,424 A | 10/1972 | Holm |
| 3,699,057 A | 10/1972 | Halko, Sr. et al. |
| 3,703,477 A | 11/1972 | Jones |
| 3,716,486 A | 2/1973 | Perricone |
| 3,761,410 A | 10/1973 | Mondshine et al. |
| 3,762,892 A | 10/1973 | Adams |
| 3,793,218 A | 2/1974 | Canevari |
| 3,838,047 A | 9/1974 | LeBlanc |
| 3,840,553 A | 10/1974 | Neel et al. |
| 3,943,117 A | 3/1976 | Force |
| 3,943,160 A | 3/1976 | Farmer, III |
| 3,980,572 A | 9/1976 | Dodo et al. |
| 3,981,808 A | 9/1976 | McClaflin et al. |
| 4,042,515 A | 8/1977 | van Zalm |
| 4,088,583 A | 5/1978 | Pyle et al. |
| 4,141,840 A | 2/1979 | Walker et al. |
| 4,217,231 A | 8/1980 | King |
| 4,250,042 A | 2/1981 | Higgins |
| 4,261,842 A | 4/1981 | Busch et al. |
| 4,344,771 A | 8/1982 | Bonazza et al. |
| 4,370,238 A | 1/1983 | Tackett, Jr. |
| 4,432,881 A | 2/1984 | Evani |
| 4,466,889 A * | 8/1984 | Miller .................... C09K 8/905 507/260 |
| 4,491,524 A | 1/1985 | Gutierrez et al. |
| 4,517,100 A | 5/1985 | Nance et al. |
| 4,519,923 A | 5/1985 | Hori et al. |
| 4,554,080 A | 11/1985 | Headley |
| 4,572,790 A | 2/1986 | Headley |
| 4,599,180 A | 7/1986 | Vio et al. |
| 4,637,883 A | 1/1987 | Patel et al. |
| 4,647,384 A | 3/1987 | Bardoliwalla et al. |
| 4,659,486 A | 4/1987 | Harmon |
| 4,710,586 A | 12/1987 | Patel et al. |
| 4,713,183 A | 12/1987 | Patel et al. |
| 4,728,444 A | 3/1988 | Clapper et al. |
| 4,778,614 A | 10/1988 | Rawlinson |
| 4,780,220 A | 10/1988 | Peterson |
| 4,828,724 A | 5/1989 | Davidson |
| 4,842,770 A | 6/1989 | Patel |
| 4,927,669 A | 5/1990 | Knox et al. |
| 4,938,891 A | 7/1990 | Lenack et al. |
| 4,956,110 A | 9/1990 | Lenack et al. |
| 4,978,459 A | 12/1990 | Bock et al. |
| 5,032,296 A | 7/1991 | Patel |
| 5,110,503 A | 5/1992 | Cohen |
| 5,124,312 A | 6/1992 | Wang |
| 5,133,887 A | 7/1992 | Terech et al. |
| 5,149,690 A | 9/1992 | Patel et al. |
| 5,189,012 A | 2/1993 | Patel et al. |
| 5,248,664 A | 9/1993 | Hale et al. |
| 5,248,665 A | 9/1993 | Hale et al. |
| 5,350,740 A | 9/1994 | Patel et al. |
| 5,388,644 A | 2/1995 | Romocki |
| 5,424,284 A | 6/1995 | Patel et al. |
| 5,436,227 A | 7/1995 | Hale et al. |
| 5,504,061 A | 4/1996 | Plank |
| 5,508,258 A | 4/1996 | Mueller et al. |
| 5,547,925 A | 8/1996 | Duncan, Jr. |
| 5,567,675 A | 10/1996 | Romocki |
| 5,569,642 A | 10/1996 | Lin |
| 5,602,082 A | 2/1997 | Hale et al. |
| 5,605,879 A | 2/1997 | Halliday et al. |
| 5,630,474 A | 5/1997 | Burger et al. |
| 5,635,458 A | 6/1997 | Lee et al. |
| 5,678,631 A | 10/1997 | Salisbury et al. |
| 5,686,396 A | 11/1997 | Hale et al. |
| 5,744,046 A | 4/1998 | Dalmazzone et al. |
| 5,749,947 A | 5/1998 | Geke et al. |
| 5,750,479 A | 5/1998 | Kramer |
| 5,776,865 A | 7/1998 | De Castro Loureiro Barreto Rosa et al. |
| 5,830,830 A | 11/1998 | Hille et al. |
| 5,891,832 A | 4/1999 | Rayborn, Sr. et al. |
| 5,908,814 A | 6/1999 | Patel et al. |
| 5,990,050 A | 11/1999 | Patel |
| 6,239,081 B1 | 5/2001 | Korzilius et al. |
| 6,316,394 B1 | 11/2001 | Morgan et al. |
| 6,406,643 B2 | 6/2002 | Linden et al. |
| 6,544,933 B1 | 4/2003 | Reid et al. |
| 6,593,401 B1 | 7/2003 | Yu et al. |
| 6,716,799 B1 | 4/2004 | Mueller et al. |
| 6,750,180 B1 | 6/2004 | Argillier et al. |
| 6,806,235 B1 | 10/2004 | Mueller et al. |
| 6,818,595 B2 | 11/2004 | Benton et al. |
| 6,844,298 B2 | 1/2005 | Prince et al. |
| 6,989,352 B2 | 1/2006 | Fisk, Jr. et al. |
| 7,056,434 B2 | 6/2006 | van der Greef et al. |
| 7,122,507 B2 | 10/2006 | Grainger et al. |
| 7,147,067 B2 | 12/2006 | Getzlaf et al. |
| 7,231,976 B2 | 6/2007 | Berry et al. |
| 7,256,163 B2 | 8/2007 | Akada et al. |
| 7,338,608 B2 | 3/2008 | Adams et al. |
| 7,343,986 B2 | 3/2008 | Dixon |
| 7,507,694 B2 | 3/2009 | Shumway et al. |
| 7,614,462 B2 | 11/2009 | Dixon |
| 7,709,419 B2 | 5/2010 | Lugo et al. |
| 7,820,842 B2 | 10/2010 | Luchini et al. |
| 8,030,252 B2 | 10/2011 | Shumway |
| 8,071,510 B2 | 12/2011 | Scoggins et al. |
| 8,109,335 B2 | 2/2012 | Luo et al. |
| 8,148,305 B2 | 4/2012 | Westfechtel et al. |
| 8,168,575 B2 | 5/2012 | Brutto et al. |
| 8,168,683 B2 | 5/2012 | Peng et al. |
| 8,403,051 B2 | 3/2013 | Huang et al. |
| 8,413,745 B2 | 4/2013 | Xiang et al. |
| 8,465,984 B2 | 6/2013 | Prasek et al. |
| 8,563,484 B2 | 10/2013 | Smith |
| 8,575,077 B2 | 11/2013 | Smith et al. |
| 8,580,715 B2 | 11/2013 | Peng et al. |
| 8,703,681 B2 | 4/2014 | Page et al. |
| 8,739,902 B2 | 6/2014 | Able |
| 8,759,265 B2 | 6/2014 | Smith |
| 8,809,240 B2 | 8/2014 | Dino |
| 8,932,997 B2 | 1/2015 | Merli et al. |
| 9,062,238 B2 * | 6/2015 | Kesavan .................. C09K 8/08 |
| 9,115,303 B2 | 8/2015 | Miller et al. |
| 9,206,378 B2 | 12/2015 | Seiki et al. |
| 9,296,969 B1 | 3/2016 | DeBlase et al. |
| 9,328,279 B2 | 5/2016 | Witham et al. |
| 9,556,722 B2 | 1/2017 | Elmbo |
| 9,574,126 B2 | 2/2017 | Gamble et al. |
| 9,598,626 B2 | 3/2017 | Witham et al. |
| 9,611,418 B2 | 4/2017 | Picco et al. |
| 9,631,131 B2 | 4/2017 | Witham et al. |
| 9,631,133 B2 | 4/2017 | Nguyen |
| 9,657,212 B2 | 5/2017 | Hurd et al. |
| 9,677,009 B2 | 6/2017 | Reyes Avila et al. |
| 9,790,414 B2 | 10/2017 | Champagne et al. |
| 9,834,718 B2 | 12/2017 | Amanullah et al. |
| 9,896,613 B2 | 2/2018 | Müller et al. |
| 9,909,050 B2 | 3/2018 | Zhou et al. |
| 9,920,582 B2 | 3/2018 | Subhahani |
| 9,969,921 B2 | 5/2018 | Wang et al. |
| 10,138,366 B2 | 11/2018 | Sexton et al. |
| 10,435,609 B2 | 10/2019 | Mäker et al. |
| 10,662,364 B2 | 5/2020 | Mukerjee et al. |
| 10,723,931 B2 | 7/2020 | Zhou et al. |
| 10,752,827 B2 | 8/2020 | Skriba |
| 10,829,680 B2 | 11/2020 | Zhou et al. |
| 10,844,310 B2 | 11/2020 | Seemeyer et al. |
| 10,988,672 B2 | 4/2021 | Chavan et al. |
| 11,034,877 B2 | 6/2021 | Santos et al. |
| 2001/0016561 A1 | 8/2001 | Hayatdavoudi |
| 2001/0036905 A1 * | 11/2001 | Parlar .................... E21B 34/14 507/200 |
| 2002/0032130 A1 | 3/2002 | Zard et al. |

(56) References Cited

U.S. PATENT DOCUMENTS

| | | | |
|---|---|---|---|
| 2002/0033260 A1* | 3/2002 | Lungwitz | C09K 23/017 166/278 |
| 2002/0098997 A1 | 7/2002 | Audibert-Hayet et al. | |
| 2003/0004071 A1 | 1/2003 | Ardito | |
| 2003/0092579 A1 | 5/2003 | Albrecht et al. | |
| 2004/0038829 A1 | 2/2004 | Thaemlitz | |
| 2004/0188355 A1 | 9/2004 | Alper | |
| 2004/0206498 A1* | 10/2004 | Phillippi | C08L 5/00 507/260 |
| 2005/0082090 A1 | 4/2005 | Grainger et al. | |
| 2006/0111252 A1 | 5/2006 | Costello et al. | |
| 2008/0009422 A1 | 1/2008 | Patel et al. | |
| 2008/0250831 A1 | 10/2008 | Rogers | |
| 2008/0261836 A1 | 10/2008 | Filler et al. | |
| 2009/0077862 A1 | 3/2009 | Schwab | |
| 2009/0090655 A1 | 4/2009 | Stark et al. | |
| 2009/0114390 A1* | 5/2009 | You | C09K 8/685 166/295 |
| 2009/0170730 A1 | 7/2009 | Wu et al. | |
| 2010/0000208 A1 | 1/2010 | McKechnie et al. | |
| 2010/0222241 A1 | 9/2010 | Merli et al. | |
| 2010/0267592 A1 | 10/2010 | Brazzel | |
| 2011/0015104 A1 | 1/2011 | Olliges | |
| 2011/0071056 A1 | 3/2011 | Saini et al. | |
| 2011/0218126 A1 | 9/2011 | Berger et al. | |
| 2011/0306527 A1 | 12/2011 | Bouffet et al. | |
| 2012/0129735 A1 | 5/2012 | Dino et al. | |
| 2012/0283151 A1 | 11/2012 | Espagne et al. | |
| 2013/0137611 A1 | 5/2013 | Pierce et al. | |
| 2013/0267445 A1 | 10/2013 | Hendrickson | |
| 2013/0338054 A1 | 12/2013 | Mcguire | |
| 2014/0066341 A1 | 3/2014 | Dino et al. | |
| 2014/0073541 A1 | 3/2014 | Ravikiran et al. | |
| 2014/0148368 A1 | 5/2014 | Ma et al. | |
| 2014/0256605 A1 | 9/2014 | Bertin et al. | |
| 2014/0274846 A1 | 9/2014 | Sunkara et al. | |
| 2014/0336086 A1 | 11/2014 | Frenkel | |
| 2015/0218433 A1 | 8/2015 | Nguyen et al. | |
| 2015/0376490 A1 | 12/2015 | Dino et al. | |
| 2016/0230067 A1 | 8/2016 | Wagle et al. | |
| 2016/0289529 A1 | 10/2016 | Nguyen et al. | |
| 2016/0298054 A1 | 10/2016 | Rintola et al. | |
| 2016/0376489 A1 | 12/2016 | Pober | |
| 2017/0145281 A1 | 5/2017 | Zhou et al. | |
| 2017/0174972 A1 | 6/2017 | Massey et al. | |
| 2017/0210970 A1 | 7/2017 | Reyes Lopez et al. | |
| 2018/0037792 A1 | 2/2018 | Champagne et al. | |
| 2018/0163123 A1 | 6/2018 | Deshpande et al. | |
| 2018/0171255 A1 | 6/2018 | Jibiki et al. | |
| 2018/0179433 A1 | 6/2018 | Hernandez et al. | |
| 2018/0194988 A1 | 7/2018 | Hilfiger et al. | |
| 2018/0215987 A1 | 8/2018 | McDaniel et al. | |
| 2018/0223157 A1 | 8/2018 | Al-Yami et al. | |
| 2018/0282607 A1 | 10/2018 | Villareal et al. | |
| 2018/0298267 A1 | 10/2018 | Wagle et al. | |
| 2018/0355284 A1 | 12/2018 | Bhole et al. | |
| 2018/0371307 A1 | 12/2018 | Emerstorfer et al. | |
| 2019/0078009 A1 | 3/2019 | Mettath et al. | |
| 2019/0119549 A1 | 4/2019 | Maeker | |
| 2019/0136117 A1 | 5/2019 | Ayirala et al. | |
| 2019/0185733 A1 | 6/2019 | Bickford et al. | |
| 2019/0233707 A1 | 8/2019 | Al-Yami et al. | |
| 2020/0024499 A1 | 1/2020 | Amanullah et al. | |
| 2020/0024500 A1 | 1/2020 | Ramasamy et al. | |
| 2020/0087562 A1 | 3/2020 | Maghrabi | |
| 2020/0123429 A1 | 4/2020 | Offenbacher et al. | |
| 2020/0157402 A1 | 5/2020 | Santos et al. | |
| 2020/0216740 A1 | 7/2020 | Misino et al. | |
| 2020/0291284 A1 | 9/2020 | Yadav et al. | |
| 2020/0369938 A1 | 11/2020 | Linscombe | |
| 2021/0032523 A1 | 2/2021 | Amanullah et al. | |
| 2021/0032524 A1 | 2/2021 | Amanullah et al. | |
| 2021/0095178 A1 | 4/2021 | Davies et al. | |
| 2021/0130674 A1 | 5/2021 | Amanullah et al. | |
| 2021/0179910 A1* | 6/2021 | Ghosh | E21B 21/00 |
| 2021/0292675 A1 | 9/2021 | Lewis et al. | |
| 2021/0403787 A1 | 12/2021 | Maeker et al. | |

FOREIGN PATENT DOCUMENTS

| | | |
|---|---|---|
| CN | 1670330 A | 9/2005 |
| CN | 1710015 A | 12/2005 |
| CN | 1944570 A | 4/2007 |
| CN | 101200631 A | 6/2008 |
| CN | 101260290 A | 9/2008 |
| CN | 102344783 A | 2/2012 |
| CN | 102391841 A | 3/2012 |
| CN | 102492402 A | 6/2012 |
| CN | 102676129 A | 9/2012 |
| CN | 101864283 B | 12/2012 |
| CN | 102851006 A | 1/2013 |
| CN | 102952528 A | 3/2013 |
| CN | 103013464 A | 4/2013 |
| CN | 103305196 A | 9/2013 |
| CN | 103756651 A | 4/2014 |
| CN | 104419388 A | 3/2015 |
| CN | 104559967 A | 4/2015 |
| CN | 104629694 A | 5/2015 |
| CN | 103275678 B | 9/2015 |
| CN | 103160259 B | 11/2015 |
| CN | 105219362 A | 1/2016 |
| CN | 105505340 A | 4/2016 |
| CN | 103351852 B | 5/2016 |
| CN | 103911130 B | 1/2017 |
| CN | 106543991 A | 3/2017 |
| CN | 106634885 A | 5/2017 |
| CN | 106833557 A | 6/2017 |
| CN | 107502317 A | 12/2017 |
| CN | 107502319 A | 12/2017 |
| CN | 107987811 A | 5/2018 |
| CN | 108276973 A | 7/2018 |
| CN | 108276975 A | 7/2018 |
| CN | 108624307 A | 10/2018 |
| CN | 108659802 A | 10/2018 |
| CN | 108690576 A | 10/2018 |
| CN | 108728056 A | 11/2018 |
| CN | 109135690 A | 1/2019 |
| CN | 109135691 A | 1/2019 |
| CN | 109439294 A | 3/2019 |
| CN | 109825265 A | 5/2019 |
| CN | 111100613 A | 5/2020 |
| CN | 111349425 A | 6/2020 |
| CN | 111423858 A | 7/2020 |
| CN | 111484835 A | 8/2020 |
| CN | 111704897 A | 9/2020 |
| CN | 111849434 A | 10/2020 |
| CN | 112175591 A | 1/2021 |
| CN | 112322260 A | 2/2021 |
| CN | 112852532 A | 5/2021 |
| CN | 110564382 B | 7/2021 |
| CN | 113185954 A | 7/2021 |
| CN | 113187384 A | 7/2021 |
| CN | 113969155 A | 1/2022 |
| CN | 114507511 A | 5/2022 |
| CN | 114539995 A | 5/2022 |
| DE | 1951281 C3 | 4/1977 |
| EP | 8591 A1 | 3/1980 |
| EP | 15491 B1 | 5/1982 |
| EP | 69960 B1 | 8/1984 |
| EP | 30559 B1 | 9/1984 |
| EP | 49484 B1 | 12/1984 |
| EP | 255161 A2 | 2/1988 |
| EP | 255161 A3 | 10/1989 |
| EP | 254412 B1 | 2/1992 |
| EP | 242040 B1 | 7/1992 |
| EP | 652272 A1 | 5/1995 |
| EP | 539810 B1 | 7/1995 |
| EP | 430602 B1 | 9/1995 |
| EP | 495579 B1 | 2/1996 |
| EP | 702073 A1 | 3/1996 |
| EP | 559472 B1 | 5/1996 |
| EP | 631608 B1 | 7/1996 |
| EP | 697912 B1 | 12/1996 |

(56) References Cited

FOREIGN PATENT DOCUMENTS

| | | |
|---|---|---|
| EP | 765429 A2 | 4/1997 |
| EP | 303734 B2 | 7/1997 |
| EP | 927236 A1 | 7/1999 |
| EP | 1116514 A1 | 7/2001 |
| EP | 850287 B1 | 8/2001 |
| EP | 1066360 B1 | 2/2002 |
| EP | 1185598 A1 | 3/2002 |
| EP | 835924 B1 | 9/2002 |
| EP | 1044247 B1 | 4/2003 |
| EP | 838514 B1 | 11/2003 |
| EP | 906946 B1 | 2/2004 |
| EP | 1438367 B1 | 7/2004 |
| EP | 1654343 A1 | 5/2006 |
| EP | 1273756 B1 | 8/2006 |
| EP | 1697482 B1 | 7/2007 |
| EP | 1862523 A1 | 12/2007 |
| EP | 1914288 A1 | 4/2008 |
| EP | 1922396 A1 | 5/2008 |
| EP | 1680477 B1 | 7/2010 |
| EP | 2520639 A1 | 11/2012 |
| EP | 1981955 B9 | 11/2013 |
| EP | 1961801 B1 | 6/2014 |
| EP | 1861457 B1 | 2/2015 |
| EP | 2292716 B1 | 11/2015 |
| EP | 2875088 B1 | 5/2016 |
| EP | 2875087 B1 | 8/2016 |
| EP | 2396394 B1 | 9/2016 |
| EP | 2258803 B1 | 3/2017 |
| EP | 2864439 B1 | 3/2017 |
| EP | 3052597 A4 | 4/2017 |
| EP | 2432860 B1 | 10/2017 |
| EP | 2954026 B1 | 3/2019 |
| EP | 3242919 B1 | 3/2019 |
| EP | 3464503 A1 | 4/2019 |
| GB | 781859 A | 8/1957 |
| GB | 1111680 A | 5/1968 |
| GB | 1490317 A | 11/1977 |
| GB | 2213177 A | 8/1989 |
| GB | 2331761 A | 6/1999 |
| GB | 2600439 A | 5/2022 |
| RU | 2742421 C1 | 2/2021 |
| RU | 2767461 C1 | 3/2022 |
| WO | 2002086381 A1 | 10/2002 |
| WO | 2007045592 A1 | 4/2007 |
| WO | 2008033592 A1 | 3/2008 |
| WO | 2010065634 A2 | 8/2010 |
| WO | 2013048653 A1 | 4/2013 |
| WO | 2014035360 A1 | 3/2014 |
| WO | 2014167374 A1 | 10/2014 |
| WO | 2015005890 A1 | 1/2015 |
| WO | 2015026355 A1 | 2/2015 |
| WO | 2015027032 A1 | 2/2015 |
| WO | 2015099811 A1 | 7/2015 |
| WO | 2016015644 A1 | 2/2016 |
| WO | 2017008219 A1 | 1/2017 |
| WO | 2019041008 A1 | 3/2019 |
| WO | 2019129792 A1 | 7/2019 |
| WO | 2019175649 A1 | 10/2019 |
| WO | 2021025685 A1 | 2/2021 |
| WO | 2021026262 A1 | 2/2021 |

OTHER PUBLICATIONS

Ramasamy, et al. (May 2023). Sustainable Chemicals Development for Drilling Fluid Application. In SPE/IADC Middle East Drilling Technology Conference and Exhibition (p. D011S002R005). SPE.

Bukhawaah, et al. (Feb. 2022). Laboratory Evaluation Comparison Study Between the Performance of Fatty Acid Solid Lubricant and Liquid Lubricant. In International Petroleum Technology Conference (p. D032S170R001). IPTC.

Foxenberg, et al. (Feb. 2008). Field experience shows that new lubricant reduces friction and improves formation compatibility and environmental impact. In SPE International Conference and Exhibition on Formation Damage Control (pp. SPE-112483). SPE.

Knox, et al. (Feb. 2005). Drilling further with water-based fluids—selecting the right lubricant. In SPE International Conference on Oilfield Chemistry? (pp. SPE-92002). SPE.

Lan, et al. (2018). Elevated-temperature and-pressure tribology of drilling fluids used in oil and gas extended-reach-drilling applications. SPE Journal, 23(06), 2339-2350.

Ramirez, et al. (Jul. 2020). A Novel Solid Lubricant Uses the Principles of Tribology to Reduce the Coefficient of Friction COF in Oil-Based Muds OBM for Extended Reach Drilling Applications. In SPE Latin America and Caribbean Petroleum Engineering Conference (p. D051S044R003). SPE.

Egberts et al. (2019). A Novel Tribometer Designed to Evaluate Geological Sliding Contacts Lubricated by Drilling Muds. Journal of Testing and Evaluation, 47(6), 4212.

Bao et al. (2022). One-Step Process of Mixed Oleic Acid Esters and Its High Temperature Lubrication Properties in Bentonite Gelling Suspension. Gels, 8(10), 678.

Magadova et al. (2021). Feasibility of Using Vegetable Manufacturing Wastes in a Lubricant Additive for Drilling Fluids. Chemistry and Technology of Fuels and Oils, 56, 861-867.

Secure Energy, Extendrill Safety Data Sheet (Jun. 12, 2024), retrived from webpage <http://sds.secure-energy.com/sdsapi/api/home/1138/getfile>.

Secure Energy, BITglide II Safety Data Sheet (Oct. 28, 2019), retrived from webpage <http://sds.secure-energy.com/sdsapi/api/home/102/getfile>.

Secure Energy, Hydro CI TM Safety Data Sheet (Aug. 19, 2024), retrived from webpage <http://sds.secure-energy.com/sdsapi/api/home/864/getfile>.

Secure Energy, Long Reach II Safety Data Sheet (Jun. 21, 2019), retrived from webpage <http://sds.secure-energy.com/sdsapi/api/home/1096/getfile>.

Secure Energy, BASEbio Safety Data Sheet (Oct. 8, 2018), retrived from webpage <http://sds.secure-energy.com/sdsapi/api/home/79/getfile>.

Secure Energy, BASEblok Safety Data Sheet (Aug. 19, 2024), retrived from webpage <http://sds.secure-energy.com/sdsapi/api/home/80/getfile>.

Secure Energy, Basemul II Safety Data Sheet (Jan. 8, 2019), retrived from webpage <http://sds.secure-energy.com/sdsapi/api/home/999/getfile>.

* cited by examiner

LUBRICANT BLENDS AND METHODS FOR IMPROVING LUBRICITY OF BRINE-BASED DRILLING FLUIDS

CROSS-REFERENCE TO RELATED APPLICATIONS

This application claims priority to and benefit from U.S. Patent Application Ser. No. 63/388,519 filed on Jul. 12, 2022, and U.S. Patent Application Ser. No. 63/521,583 filed on Jun. 16, 2023, each of which is hereby incorporated by reference in their entirety.

TECHNICAL FIELD

The present disclosure generally relates to methods for increasing the lubricity of a brine-based drilling fluid, and in particular to lubricant blends and methods for improving the functionality of lubricants in brine-based drilling fluids having an alkaline pH and/or a threshold divalent cation concentration.

BACKGROUND

Drilling fluids are relied on to perform numerous functions during wellbore drilling and well completion. For example, drilling fluids are used to reduce friction associated with drill bit advancement, to reduce corrosion of wellbore drilling components, and to minimize hydrostatic pressure differentials within the wellbore. Drilling fluids also aid in transporting drill cuttings within the wellbore and away from a drill bit and towards a collection point where they can be removed by mechanical or physical means.

Brines and produced water have been used as drilling fluids in the oil and gas industry for a number of years. Indeed, with increased efforts towards making oil and gas recovery more environmentally-friendly, reusing brines and produced water (rather than simply disposing of this by-product) has received increased attention in recent years. Alongside these efforts to reuse brine and produced water is the desire to use safer lubricants as additives in brine-based drilling fluids to improve their lubricity.

Although brines and produced water have been found to exhibit some functionality as drilling fluids, they are often ineffective in providing sufficient lubricity without additives for use as lubricating agents. In this regard, various lubricants for drilling fluids exist, but many of the safer and more cost-conscious lubricants are not effective and/or are incompatible with brine-based drilling fluids having an alkaline pH (i.e. a pH >7.0). Further, many of these lubricants exhibit a lack of tolerance to, or incompatibility with, brine-based drilling fluids having significant divalent cation concentrations (e.g. beyond a particular threshold). The need for increased lubricity in these alkaline and divalent cation rich brine-based drilling fluids is a significant concern because, while produced water and brine tend to have a neutral pH, it is desirable to increase the pH for corrosion control reasons. This, however, increases the negative impacts of the divalent cation species in respect of conventional lubricants. Thus, in these alkaline conditions many of the safe and environmentally-friendly lubricants (e.g. vegetable oil and/or fatty acid based lubricants) are not compatible and are not sufficiently effective as lubricants.

Thus, there exists a need for improved methods and lubricants for increasing the lubricity of brine-based drilling fluids.

SUMMARY

The present disclosure relates to methods for increasing the lubricity of a brine-based drilling fluid, and in particular to lubricant blends and methods for improving the functionality of lubricants in brine-based drilling fluids having an alkaline pH.

In an embodiment, the present disclosure relates to a method for increasing the lubricity of a brine-based drilling fluid having an alkaline pH, the method comprising: providing a produced water or a brine having a threshold divalent cation concentration and an alkaline pH; adding to the produced water or brine at least one source of free fatty acids; and optionally, adding to the produced water or brine a dispersant.

In an embodiment, the present disclosure relates to a lubricant blend having improved tolerance to a brine-based drilling fluid having an alkaline pH, the lubricant blend comprising: at least one source of free fatty acids; and a dispersant.

In an embodiment, the present disclosure relates to use of the lubricant blend as described herein for improving the lubricity of a brine-based drilling fluid having an alkaline pH and a threshold divalent cation concentration.

In an embodiment, the present disclosure relates to use of a lubricant blend for forming a semi-solid lubricant when delivered downhole in admixture with a produced water or brine having a threshold divalent cation concentration and an alkaline pH, wherein the lubricant blend comprises: between about 60% and about 80% by weight fatty acids, the fatty acids comprising at least 60% by weight oleic acid; and between about 1.0% and about 10% by weight a dispersant being a fatty imidazoline ethyl-sulfate quaternary. In a particular embodiment, the lubricant comprises about 95% by weight fatty acids, the fatty acids comprising at least 60% by weight oleic acid; and about 5% by weight dispersant being 1:1 TOFA-AEEA imidazoline quaternized with diethylsulfate.

In an embodiment, the present disclosure relates to a brine-based drilling fluid comprising: a produced water or a brine having a threshold divalent cation concentration and an alkaline pH; and a lubricant blend as described herein.

In an embodiment, the present disclosure relates to a method for improving lubricity in a wellbore during drilling operations, the method comprising: combining at surface, in a modulated manner, (i) a quantity of a produced water or brine having a threshold divalent cation concentration and/or an alkaline pH and (ii) a quantity of a lubricant blend comprising at least one source of free fatty acids and a dispersant, wherein the modulated manner targets the formation of a brine-based drilling fluid that comprises a semi-solid lubricant that adheres to downhole surfaces and substantially remains downhole during the drilling operation; and delivering downhole the brine-based drilling fluid, wherein the modulated manner comprises adding the lubricant blend to the produced water or brine at an amount sufficient to: promote saponification between divalent cations in the produced water or brine and the free fatty acids in the lubricant blend to form the semi-solid lubricant; and/or promote affinity of the semi-solid lubricant to adhere to the downhole surfaces.

In an embodiment, the present disclosure relates to a lubricant blend for forming a semi-solid lubricant when combined with a produced water or brine having an alkaline pH and a threshold divalent cation concentration, the lubricant blend comprising: between about 60% and about 80% oleic acid; and between about 1% and about 10% of 1:1 TOFA-AEEA imidazoline quaternized with diethylsulfate.

Other aspects and embodiments of the disclosure are evident in view of the detailed description provided herein.

BRIEF DESCRIPTION OF THE DRAWINGS

Further advantages, permutations and combinations of the invention will now appear from the above and from the following detailed description of the various particular embodiments of the invention taken together with the accompanying drawings, each of which are intended to be non limiting, in which.

DETAILED DESCRIPTION

Figure 1:
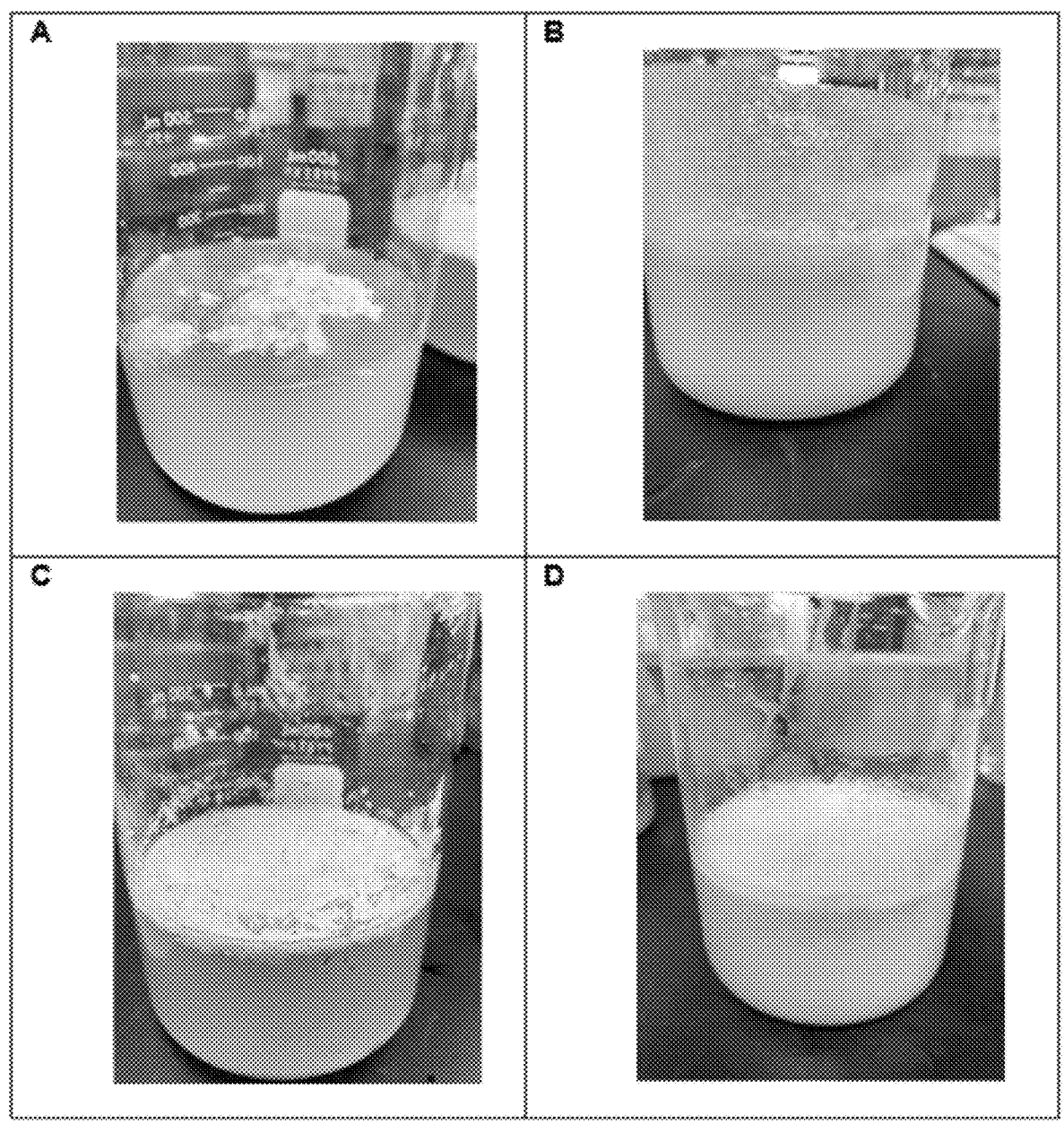
FIG. 1 shows images depicting the result of dispersibility testing involving produced water having an alkaline pH, whereby panel (A) to a filtered sample of the produced water was added a lubricant comprising a 1:1 by weight ratio of vegetable oil and oleic acid; panel (B) to an unfiltered sample of the produced water was added a lubricant comprising a 1:1 by weight ratio of vegetable oil and oleic acid; panel (C) to a filtered sample of the produced water was added a lubricant blend comprising a 1:1 by weight ratio of vegetable oil and oleic acid, and a dispersant comprising a cationic fatty imidazoline ethyl-sulfate quaternary (TOA 80DQ); and panel (D) to an unfiltered sample of the produced water was added a lubricant blend comprising a 1:1 by weight ratio of vegetable oil and oleic acid, and a dispersant comprising a cationic fatty imidazoline ethyl-sulfate quaternary (TOA 80DQ).

Many of the safe and environmentally-friendly lubricants for drilling fluids, such as vegetable oil and/or fatty acid based lubricants, are limited by their incompatibility or less than desired functionality in brine-based drilling fluids having an alkaline pH and/or a significant divalent cation concentration. The high pH (e.g. pH >9) of produced water and brine that is desirable for corrosion control results in the formation of monovalent salts of such fatty acids, which are known to create foaming issues. In addition, the presence of high divalent cation concentrations, in particular calcium (e.g. $Ca^{2+}$), in many produced waters and brines often results in insoluble calcium salts of lubricants containing fatty acids, e.g. vegetable oil based lubricants. Thus, brine-based drilling fluids having alkaline pH, and optionally high calcium concentrations (e.g. 500 mg/L and greater) create problematic environments for many desirable lubricants in the oil and gas industry.

Traditional techniques for increasing lubricity of downhole fluids stringently apply a general rule that forming a grease, "cheese" or wax with the lubricant should be avoided. These forms of products have caused significant issues in jamming or gumming up downhole tools, and negatively impacting surface equipment when the lubricant returns to surface in the produced water or brine. In fact, a number of lubricant manufacturers have warning labels or stop signs on their lubricants advising that they should not be used for high pH and calcium-rich environments, such as produced water or brine having an alkaline pH. To avoid the formation of these problematic greases/waxes, lubricants for produced water or brines having alkaline pH have largely avoided the use of fatty acids or have used lubricants with significant quantities of solvents, de-foamers, alkalinity adjusters, and other substances to prevent foaming and/or formation of greases/waxes. Moreover, if these problematic greases or waxes do form, operators have been advised to adopt various different approaches to avoid them from being delivered downhole, such as for example maintaining the weight of produced water or brine in the suction tank at high levels so that if greases/waxes are formed, they do not end up being delivered downhole.

Also, traditional techniques for applying lubricants downhole involve operating at relatively high lubricant concentrations in the drilling fluids that are delivered downhole. This lubricant concentration is determined as a concentration that provides sufficient lubrication under given drilling conditions. Given the liquid nature and/or low affinity for downhole surfaces of traditional lubricants within the drilling fluids, a significant quantity of these prior lubricants come back up to surface in the produced water or brine.

Advantageously, the present disclosure provides methods and lubricant blends capable of resolving the incompatibility with brine-based drilling fluids having an alkaline pH and previously problematic divalent cation concentrations. Without being bound to any particular theory, in exemplary embodiments the results herein demonstrate the ability of dispersants as described herein and/or magnesium at a threshold magnesium concentration, together with lubricants as described herein, to improve lubricity in alkaline produced water or brine that is used to prepare the brine-based drilling fluid.

Described herein are embodiments of lubricant blends that can, among other functions, improve the lubricity of brine-based drilling fluids having an alkaline pH and/or threshold divalent cation concentrations. Also described herein are embodiments of methods for increasing the lubricity of a brine-based drilling fluid having an alkaline pH and/or threshold divalent cation concentrations. Also, described herein are embodiments of uses of lubricant blends described for improving the lubricity of a brine-based drilling fluid having an alkaline pH and/or threshold divalent cation concentrations. Also, described herein are embodiments of brine-based drilling fluids prepared by the methods and/or using the lubricant blends. In embodiments herein, the methods and lubricant blends are capable of improving the lubricity of brine-based drilling fluids having both an alkaline pH and a high calcium concentration (e.g. 500 mg/L or greater).

Described herein is also a novel approach for drilling operations using brine-based drilling fluids having alkaline pH and/or threshold divalent cation concentrations. As opposed to traditional approaches that stringently avoid the formation of a grease or wax downhole, embodiments of methods herein that employ certain lubricant blends disclosed herein embrace the formation of a semi-solid lubricant within the drilling fluid.

As used herein, the term "semi-solid lubricant" is intended to refer to a highly viscous substance that has advantageous properties downhole with respect to improving lubricity of drilling fluids. In an embodiment, the semi-solid lubricant has a consistency similar to a butter or Vaseline™. It has been found in experimental studies, as well as the field trials herein, that the semi-solid lubricant is formed within brine-based drilling fluids having an alkaline pH and threshold divalent cation concentration. The semi-solid lubricant is a lubricious semi-solid substance within the continuous aqueous phase of the brine-based drilling fluid, which demonstrates a substantial affinity for downhole surfaces (e.g. to the extent that it generally depletes downhole during drilling operations).

By "depletes downhole", it is meant that the semi-solid lubricant exhibits a property of adhering to the downhole surfaces and not returning to the surface in the produced water or brine. Indeed, it has been found that a unique feature of the semi-solid lubricant herein is that it does not substantially bind up on itself, but rather adheres to downhole surfaces to provide lubrication.

The semi-solid lubricant formed with the lubricant blends and methods disclosed herein has been found in field trial drilling operations to: (i) provide reduced coefficients of friction (COF) not thought possible in the industry using water-based drilling mud (WBM); (ii) achieve these reduced COFs with lower quantities of lubricant; (iii) avoid issues with the lubricant forming solids; (iv) achieve improved affinity to downhole surfaces, including metal and rock, and thus substantially remain downhole throughout drilling operations, (v) eliminate the need for expensive bead recovery units, (vi) permit the drilling of complete wells with COFs similar to oil-based drilling mud (OBM), and (vii) achieve drilling total depth (TD) with the brine-based drilling fluid disclosed herein without need to switch to oil-based mud/invert emulsion.

Without being bound by any particular theory, it is believed that the formation of the semi-solid lubricant herein involves the alkaline pH and presence of divalent cations in the produced water or brine, and saponification with the specific fatty acids used in the lubricant blends herein. In an embodiment, the lubricant blend comprises a mixture of fatty acids and dispersant. In an embodiment, the lubricant blend comprises primarily oleic acid as the fatty acid. In a particular embodiment, the lubricant blend comprises about 95% by weight source of free fatty acids and about 5% by weight dispersant, such as 1:1 TOFA-AEEA imidazoline quaternized with diethylsulfate. In an embodiment, the source of free fatty acids comprises at least 60% by weight oleic acid. In an embodiment, the semi-solid lubricant of the present disclosure comprises primarily calcium oleate as the saponified fatty acid.

Surprisingly, as opposed to traditional techniques, it has been found that the semi-solid lubricant of the present disclosure substantially remains downhole in the wellbore. Also, it may be applied in a small quantity and with a slow rate of delivery downhole, thus improving efficiency and cost of drilling operations. Also, it has been observed in field trials that small increases in the quantity of lubricant of the present disclosure delivered downhole during drilling operations results in rapid reductions in torque, indeed more rapid than is typically seen with conventional lubricants (see e.g. Example 5e). Thus, if the torque of the drill string rises above a desired torque, the amount of lubricant blend added to the produced water or brine can be increased to quickly reduce torque and/or restore desired operational torque. In contrast, if excess lubricant is observed in drilling fluid returning to surface, the amount of lubricant blend added to the brine-based drilling fluid can be reduced such that all or substantially all of the lubricant depletes downhole.

It will be appreciated by those skilled in the art that the drilling fluids, uses, methods, and embodiments described herein are for illustrative purposes intended for those skilled in the art and should not be construed as limiting in any way. Likewise, it will be appreciated by those skilled in the art that the volumes, masses, and other physical parameters described herein are for illustrative purposes intended for those skilled in the art and should not be construed as limiting in any way. All references to aspects, embodiments or examples throughout the disclosure should be considered references to illustrative and non-limiting aspects, embodiments or examples. All references to elements in the singular form should be considered to encompass plural forms of the same. All references to elements in the plural form should be considered to encompass singular forms of the same.

Methods

In an aspect of the present disclosure, there is provided a method for increasing the lubricity of a brine-based drilling fluid, the method comprising: providing a produced water or a brine having a threshold divalent cation concentration and an alkaline pH; adding to the produced water or brine at least one source of free fatty acids; and optionally, adding to the produced water or brine a dispersant. The steps of the method may be performed in any order. For example, in a preferred embodiment, a produced water or brine having the threshold divalent cation concentration and an alkaline pH may be provided and then the adding step(s) carried out. Alternatively however, the at least one source of fatty acids (and optionally dispersant) may be added to a produced water or brine, and then the produced water or brine may be brought to the threshold divalent cation concentration and alkaline pH. Alternatively, any combination of the steps may be taken. For example, a produced water or brine having an alkaline pH may be provided, the adding step(s) carried out, and then the produced water or brine produced water or brine may be brought to the threshold divalent cation concentration and alkaline pH.

In the context of the present disclosure, the term "increasing the lubricity" is meant to refer to the ability of the drilling fluid to provide a reduction in the coefficient of friction (COF) between the two contacting surfaces, such as the drill pipe or drill bit on the rock, or the drill pipe on the casing.

In the context of the present disclosure, the term "brine-based drilling fluid" includes any number of drilling fluids prepared using brines, produced water, or any combination thereof. As opposed to invert emulsion drilling fluids which have a continuous oil phase, brine-based drilling fluids have a continuous aqueous phase provided substantially by the produced water or the brine. Any produced water or brine may be used in the context of the present disclosure. In an embodiment, the produced water or brine is one having a threshold divalent cation concentration as described herein, including either one or both of a threshold calcium concentration and a threshold magnesium concentration. Without limitation, exemplary brines include sodium chloride, potassium chloride, calcium chloride, magnesium chloride, calcium nitrate, sodium formate, potassium formate, sodium bromide, calcium bromide, zinc bromide, and cesium formate, or any combination thereof.

In the context of the present disclosure, the brine-based drilling fluid, produced water, and/or brine is one having an alkaline pH. By this, it is meant a pH of greater than 7.0. It is contemplated herein that the produced water or brine may not naturally have an alkaline pH, but rather may be made alkaline by adjusting the pH, for example and without limitation by the addition of sodium hydroxide and/or lime. It is further contemplated herein that the addition of the lubricant and/or dispersant as described herein may adjust the pH. However, in embodiments of the present disclosure, both the produced water or brine and the resultant brine-based drilling fluid have an alkaline pH. In an embodiment, the alkaline pH is any pH in the range of between 7.0 and 14.0. In an embodiment, the alkaline pH is about 7.5, about 8.0, about 8.5, about 9.0, about 9.5, about 10.0, about 10.5, about 11.0, about 11.5, about 12.0, about 12.5, about 13.0, about 13.5, or about 14.0. In an embodiment, the alkaline pH is at least 8.0, at least 8.5, at least 9.0, at least 9.5, at least 10.0, at least 10.5, at least 11.0, at least 11.5, at least 12.0, at least 12.5, at least 13.0, or at least 13.5. In an embodiment, the alkaline pH is at least 9.0. In an embodiment, the alkaline pH is at least 10.5. In an embodiment, the alkaline pH is about 10.5 or 11.0.

In an embodiment, the pH of the produced water or brine may correlate with the amount of dispersant needed, or even whether a dispersant is required at all. For example, in certain embodiments, it has been observed that less dispersant is required at more alkaline pH.

In the context of the present disclosure, the term "produced water" has its plain and ordinary meaning as a by-product of oil and gas production. It is water that comes out of the well, typically with the crude oil, during production. Produced water contains soluble and non-soluble oil, organics, suspended solids, dissolved solids, and various chemicals used in the production process. Thus, produced water generally consists of water from the geologic formation, injection water, oil and salts.

In the context of the present disclosure, the term "brine" refers to various salts and salt mixtures dissolved in an aqueous solution. A produced water is typically a type of brine. However, as used herein, brine further includes prepared solutions that may not be produced during oil and gas production. Brines typically lack solid particles.

The methods herein include a step of providing a produced water or a brine having a threshold divalent cation concentration and an alkaline pH. By this, it is meant to make available or create such a produced water or brine during the performance of the method. For example, and without limitation, providing may involve (i) circulating produced water or brine in an appropriate manner at a drilling operation to make it available for the addition of the source(s) of the free fatty acids, (ii) making available a produced water or brine delivered from another location (on or off-site) for the addition of the source(s) of the free fatty acids, (iii) employing either of the above and further adjusting the pH and/or the divalent cation concentration to provide a produced water or a brine having the threshold divalent cation concentration and the alkaline pH, or (iv) any combination thereof.

In some embodiments, the produced water or brine is provided at a surface location, meaning the step of the method does not occur within the wellbore but rather on the surface, such as for example on a drilling rig at surface. However, it is also contemplated that the produced water or brine may be provided within the well and the subsequent steps in the methods also performed within the well.

The produced water or brine has a threshold divalent cation concentration. By this, it is meant any concentration of divalent cation (e.g. calcium, magnesium, etc.) to sufficiently react with fatty acids in the lubricant blend herein to form metallic salts thereof for forming the semi-solid lubricant. In an embodiment, there is a similar concentration of calcium ($Ca^{2+}$) and magnesium ($Mg^{2+}$). In an embodiment, there is a higher concentration of calcium ($Ca^{2+}$) than magnesium ($Mg^{2+}$). In an embodiment, there is a higher concentration of magnesium ($Mg^{2+}$) than magnesium ($Ca^{2+}$). An advantageous aspect of the present disclosure is the tolerance of the lubricants and lubricant blends herein to the alkaline pH and threshold divalent cation concentration so as to allow formation of the semi-solid lubricant.

As used herein, the term "threshold divalent cation concentration" refers to the sum of the concentration of all of the divalent cations within the produced water, brine, or brine-based drilling fluid. The threshold divalent cation concentration is separate from, and does not take into account, the concentration of any monovalent ions, cationic or anionic (e.g. $Na^+$, $Cl^-$, $K^+$, $SO_4^-$, etc.), within the produced water or brine. In an embodiment, the threshold divalent cation concentration is in relation to the concentration of calcium, e.g. when magnesium is absent. In an embodiment, the threshold divalent cation concentration is in relation to the concentration of magnesium, e.g. when calcium is absent. In preferred embodiments, the threshold divalent cation concentration is in relation to both calcium and magnesium. In an embodiment, the threshold divalent cation concentration is between about 250 mg/L and about 10,000 mg/L. In an embodiment, the threshold divalent cation concentration is between about 250 mg/L and about 10,000 mg/L. In an embodiment, the threshold divalent cation concentration is between about 1000 mg/L and about 10,000 mg/L. In an embodiment, the threshold divalent cation concentration is between about 1000 mg/L and about 5000 mg/L. In an embodiment, the threshold divalent cation concentration is between about 5000 mg/L and about 10,000 mg/L. In an embodiment, the threshold divalent cation concentration is at least 1000 mg/L, at least 2500 mg/L, at least 5000 mg/L, at least 10,000 mg/L, or more. In an embodiment, the threshold divalent cation concentration is about 1000 mg/L, about 2500 mg/L, about 5000 mg/L, about 7500 mg/L, about 10,000 mg/L, or more. The divalent cations may be in any form in the produced water, brine, or brine-based drilling fluid, including for example soluble form and/or as a dispersed solid. In an embodiment, the divalent cations are in soluble form. In an embodiment, the divalent cations are a dispersed solid. In an embodiment, the divalent cations are both soluble and dispersed solid. As used herein, the term "concentration" refers to the amount of the ion, in whatever form (e.g. soluble or dispersed solid) within the produced water or brine.

The divalent cations may already be present in the produced water or brine in sufficient amounts to achieve the desired threshold divalent cation concentration. Alternatively, an amount of divalent cations could be added to achieve the desired threshold divalent cation concentration.

In an embodiment, the produced water or brine has a threshold magnesium concentration. In an embodiment, the threshold magnesium concentration is to shift the formation of fatty acid salts upon addition of the lubricants described herein to favour magnesium salts of fatty acids or to provide the brine or produced water with a sufficient amount of magnesium salt particles to stabilize dispersion of the lubricants described herein. In an embodiment, the threshold magnesium concentration is between about 250 mg/L and about 10,000 mg/L. In an embodiment, the threshold magnesium concentration is between about 250 mg/L and about 10,000 mg/L. In an embodiment, the threshold magnesium concentration is between about 1000 mg/L and about 5000 mg/L. In an embodiment, the threshold magnesium concentration is between about 5000 mg/L and about 10,000 mg/L. In an embodiment, the threshold magnesium cation concentration is at least 250 mg/L, at least 500 mg/L, at least 1000 mg/L, at least 2500 mg/L, at least 5000 mg/L, at least 10,000 mg/L, or more. In an embodiment, the threshold magnesium concentration is about 250 mg/L, about 500 mg/L, about 1000 mg/L, about 2500 mg/L, about 5000 mg/L, about 7500 mg/L, about 10,000 mg/L, or more. In an embodiment, the threshold magnesium concentration is at least about 500 mg/L. In an embodiment, the threshold magnesium concentration is about 1000 mg/L. In an embodiment, the threshold magnesium concentration is about 5000 mg/L. The magnesium may be in any form in the produced water, brine, or brine-based drilling fluid, including for example in soluble form and/or as a dispersed solid. In an embodiment, the magnesium is soluble form. In an embodiment, the magnesium is a dispersed solid. In an embodiment, the magnesium is both soluble and dispersed solid.

In an embodiment, the produced water or brine has a threshold calcium concentration. In an embodiment, the threshold calcium concentration is to shift the formation of fatty acid salts upon addition of the lubricants described herein to favour calcium salts of fatty acids or to provide the brine or produced water with a sufficient amount of calcium salt particles to stabilize dispersion of the lubricants described herein. In an embodiment, the threshold calcium concentration is between about 250 mg/L and about 10,000 mg/L. In an embodiment, the threshold calcium concentration is between about 250 mg/L and about 10,000 mg/L. In an embodiment, the threshold calcium concentration is between about 1000 mg/L and about 5000 mg/L. In an embodiment, the threshold calcium concentration is between about 5000 mg/L and about 10,000 mg/L. In an embodiment, the threshold calcium cation concentration is at least 250 mg/L, at least 500 mg/L, at least 1000 mg/L, at least 2500 mg/L, at least 5000 mg/L, at least 10,000 mg/L, or more. In an embodiment, the threshold calcium concentration is about 250 mg/L, about 500 mg/L, about 1000 mg/L, about 2500 mg/L, about 5000 mg/L, about 7500 mg/L, about 10,000 mg/L, or more. In an embodiment, the threshold calcium concentration is at least about 500 mg/L. In an embodiment, the threshold calcium concentration is about 1000 mg/L. In an embodiment, the threshold calcium concentration is about 5000 mg/L. The calcium may be in any form in the produced water, brine, or brine-based drilling fluid, including for example in soluble form and/or as a dispersed solid. In an embodiment, the calcium is soluble form. In an embodiment, the calcium is a dispersed solid. In an embodiment, the calcium is both soluble and dispersed solid.

In some embodiments, the methods herein include a step of adding magnesium or calcium to the produced water or brine to obtain the threshold divalent cation concentration. In an embodiment, the produced water or brine is brought above the threshold divalent cation concentration by adding one or both of the magnesium and calcium prior to adding the at least one source of free fatty acids. In an embodiment, the produced water or brine is brought above the threshold divalent cation concentration by adding one or both of the magnesium and calcium prior to adding both the dispersant and the at least one source of free fatty acids.

The methods herein include a step of adding to the produced water or brine at least one source of free fatty acids.

In the context of the present disclosure, the term "source of free fatty acids" refers to any substance that is capable of providing free fatty acids when in the brine or produced water. In an embodiment, the source of free fatty acids is a substance that already contains free fatty acids prior to being introduced to the brine or produced water. In an embodiment, the source of free fatty acids is a substance that is capable of being converted to provide free fatty acids subsequent to being introduced to the brine or produced water. In an embodiment, the source of free fatty acids is a substance that both (i) already contains free fatty acids prior to be introduced to the brine or produced water and (ii) is capable of being converted to provide further free fatty acids subsequent to being introduced to the brine or produced water.

For example and without being bound by theory, various substances may contribute free fatty acids subsequent to addition to the brine or produced water by a chemical process, such as hydrolysis. As one example, vegetable oil undergoes hydrolysis at alkaline pH (e.g. pH 9.0 or greater) to provide free fatty acids and glycerol. As another example, fatty acid esters (e.g. in biodiesel) undergo hydrolysis at alkaline pH to provide free fatty acids.

The source of free fatty acids may be any suitable substance that provides free fatty acids to the brine or produced water. In an embodiment, the at least one source of free fatty acids is a vegetable oil, an animal fat, biodiesel, one or more fatty acids, one or more fatty acid esters, or any combination thereof.

The vegetable oil may be any vegetable oil, including without limitation canola oil, corn oil, soybean oil, rapeseed oil, safflower oil, cottonseed oil, grapeseed oil, olive oil, coconut oil, sunflower oil, palm oil, and any other oil extracted from a plant, its fruit, or its seed. The vegetable oil may also be any combination or mixture of individual vegetable oils.

As used herein, the term "one or more fatty acids" refers to any fatty acid, which is commonly a carboxylic acid with an aliphatic chain. The fatty acid may be a short-chain fatty acid (SCFA) having five or less carbon atoms, a medium-chain fatty acid (MCFA) having 6-12 carbon atoms, a long-chain fatty acid (LCFA) having 13-21 carbon atoms, a very long-chain fatty acid (VLCFA) having 22 or more carbon atoms, or any combination thereof. The fatty acid may be branched or unbranched, and saturated or unsaturated. In an embodiment, the fatty acid is a saturated or mono-unsaturated fatty acid, or any combination thereof. In an embodiment, the fatty acid is caprylic acid (8:0), capric acid (10:0), lauric acid (12:0), myristic acid (14:0), palmitic acid (16:0), stearic acid (18:0), arachidic acid (20:0), behenic acid (22:0), lignoceric acid (24:0), cerotic acid (26:0), myristoleic acid (14:1), palmitoleic acid (16:1), sapienic acid (16:1), oleic acid (18:1), elaidic acid (18:1), vaccenic acid (18:1), linoleic acid (18:2), linoelaidic acid (18:2), α-linolenic acid (18:3), arachidonic acid (20:4), eicosapentaenoic acid (20:5), erucic acid (22:1), docosahexaenoic acid (22:6), or any combination thereof. In an embodiment, the fatty acid is linoleic acid. In a particular embodiment, the fatty acid is oleic acid.

As used herein, the term "one or more fatty acid esters" refers to any fatty acid ester, which is commonly the result of the combination of a fatty acid and an alcohol. Where the alcohol component is glycerol, the fatty acid ester may be a monoglyceride, diglyceride or triglyceride.

In an embodiment, the source of free fatty acids may be a mixture of any two or more of the above sources. In an embodiment, it is a mixture of a vegetable oil and fatty acids. In an embodiment, it is a mixture of vegetable oil and a saturated or monounsaturated fatty acids. In an embodiment, it is a mixture of canola oil and oleic acid.

In an embodiment, the at least one source of free fatty acids comprises predominantly saturated or mono-unsaturated fatty acids. In an embodiment, the at least one source of free fatty acids comprises at least 60% by weight saturated fatty acids, at least 60% by weight mono-unsaturated fatty acids, or at least 60% by weight of a combination of saturated and mono-unsaturated fatty acids. In an embodiment, the at least one source of free fatty acids comprises between about 10% and 100% by weight oleic acid. In an embodiment, the at least one source of free fatty acids comprises at least 40% by weight oleic acid. In an embodiment, the at least one source of free fatty acids comprises at least 60% by weight oleic acid. In an embodiment, the at least one source of free fatty acids comprises at least 65%, at least 70%, at least 75%, at least 80%, at least 85%, at least 90%, at least 95%, or at least 99% by weight oleic acid. In an embodiment, the at least one source of free fatty acids consists of oleic acid. In an embodiment, the at least one source of free fatty acids comprises between about 60% and 100% by weight oleic acid. In an embodiment, the at least one source of free fatty acids comprises between about 60% and about 90% by weight oleic acid. In an embodiment, the at least one source of free fatty acids comprises between about 60% and about 80% by weight oleic acid. In an embodiment, the at least one source of free fatty acids comprises between about 70% and about 80% by weight oleic acid. In an embodiment, in addition to the oleic acid, the at least one source of free fatty acids comprises palmitic acid (C16:0), stearic acid (C18:0), palmitoleic acid (C16:0), linoleic acid (C18:2), linolenic acid (C18:3), or any combination thereof.

In some embodiments of the methods herein, the at least one source of free fatty acids is added to the produced water or brine after the threshold divalent cation concentration is achieved, and optionally after the dispersant is added. Without being bound by theory, the threshold divalent cation concentration and/or dispersant as described herein provides a suitable environment for increasing lubricity of produced waters and brines with lubricants having the at least one source of fatty acids. In an embodiment, the at least one source of free fatty acids is added to the produced water or brine after both the threshold divalent cation concentration is achieved and the dispersant is added. In accordance with the present disclosure, the produced water or brine is one having an alkaline pH. The produced water or brine may naturally have an alkaline pH or the pH may be adjusted to provide the alkaline pH. If adjusted to provide the alkaline pH, this may be done before or after the threshold divalent cation concentration is achieved (assuming the produced water or brine is one that needs to be supplemented with divalent cations to achieve the threshold divalent cation concentration).

Thus, in some embodiments, the methods herein include the step of adding to the produced water or brine a dispersant.

In some embodiments herein, the dispersant is a cationic dispersant, meaning that the dispersant is or comprises a compound or molecule in which a part of the compound or molecule is a positive ion (cation). Exemplary cationic dispersants may include, for example and without limitation, quaternary amines and alkyl dimethyl benzyl ammonium chloride (ADBAC) quats. In particular, exemplary cationic dispersants may include: dicocodimethyl ammonium chloride, benzyl alkyl-pyridine quat, benzyltrimethylammonium chloride, cetyl trimethyl ammonium chloride, bisquat of dichloroethyl ether, polyquaternium ammonium chloride, benzyltriethylammonium chloride, and C12-14 alkyl-benzylammonium chloride.

In some embodiments herein, the dispersant comprises an imidazoline or a imidazoline-containing compound. Exemplary imidazoline dispersants may include, for example and without limitation, Fatty Imidazoline Ethyl-Sulfate Quat or TOFA Imidazoline. In an embodiment, the dispersant comprises a fatty imidazoline ethyl-sulfate quaternary, such as for example tall oil ethylsulfate quaternary. In an embodiment, the dispersant comprises or is 1:1 TOFA-AEEA imidazoline quaternized with diethylsulfate, such as for example TOA 80DQ (StarChem™; Ontario, Canada). This product is also referenced in the literature under CAS #70955-34-9 as fatty acid, tall-oil, reaction products with 2-((2-aminoethyl)amino)ethanol, di-Et sulfate-quaternized. In other embodiments, the dispersant comprises or is 1:1 TOFA-DETA imidazoline with ~65% ring closure (TOD 60; StarChem™); 1:1 TOFA-AEEA imidazoline with ~90% ring closure (TOA 90; StarChem™); 1:1 Oleic-AEEA imidazoline with ~90% ring closure (OLA 90; StarChem™); 1:1 Oleic-DETA imidazoline quaternized with diethylsulfate in dipropylene glycol & surfactants (OLD 70DQ; StarChem™); or 1:1 TOFA-DETA imidazoline with ~60% ring closure (2096; StarChem™).

Some embodiments of the methods of the present disclosure involve adding both the dispersant and the at least one source of free fatty acids to the produced water or brine. In such embodiments, the components are typically added after achieving the alkaline pH and the threshold divalent cation concentration in the brine or produced water. In an embodiment of such methods, the dispersant is added to the produced water or brine prior to addition of the at least one source of free fatty acids. In other embodiments, the dispersant and the at least one source of free fatty acids are added to the produced water or brine together in a lubricant blend of the present disclosure, such as described elsewhere herein.

In another aspect, provided herein is a method for improving lubricity in a wellbore during drilling operations, the method comprising: combining at surface, in a modulated manner, (i) a quantity of a produced water or brine having a threshold divalent cation concentration and/or an alkaline pH and (ii) a quantity of a lubricant blend comprising at least one source of free fatty acids and a dispersant, wherein the modulated manner targets the formation of a brine-based drilling fluid that comprises a semi-solid lubricant that adheres to downhole surfaces and substantially remains downhole during the drilling operation; and delivering downhole the brine-based drilling fluid, wherein the modulated manner comprises adding the lubricant blend to the produced water or brine at an amount sufficient to: promote saponification between divalent cations in the produced water or brine and the free fatty acids in the lubricant blend to form the semi-solid lubricant; and/or promote affinity of the semi-solid lubricant to adhere to the downhole surfaces.

As used herein, the term "modulated manner" is intended to refer to operating conditions aimed at promoting the formation of the semi-solid lubricant by combining an appropriate amount of the lubricant blend as disclosed herein with the produced water or brine to promote saponification between divalent cations in the produced water or brine and the free fatty acids in the lubricant blend, and delivering an appropriate amount of the brine-based drilling fluid downhole. This can be measured, for example, by monitoring the brine-based drilling fluid being formed for the presence of semi-solid lubricant within the fluid; monitoring torque of the drill string; and/or monitoring the presence of lubricant in produced water or brine returning to surface.

As discussed herein, traditional drilling operations focus on using a lubricant concentration suitable for providing lubrication downhole without forming a grease, "cheese" or wax. In such operations, due to low affinity of the conventional lubricants for downhole surfaces, a significant quantity of lubricant returns to surface in the produced water. In essence, to attain a suitable reduction in torque with conventional lubricants, such a significant amount of lubricant is needed that a substantial quantity returns to surface. This is a common aspect of drilling with conventional lubricants in brine-based drilling fluids.

This is opposite to the methods herein which focus on (i) adjusting the rate of addition of lubricant to promote formation of a semi-solid lubricant within the brine-based drilling fluid; (ii) adjusting the rate of addition of lubricant based on quick and effective changes in torque, and (iii) adjusting the rate of addition to ensure the lubricant (semi-solid) is depleted downhole. The methods disclosed herein are contrary to existing approaches in the industry, and made possible by the effectiveness of the lubricants disclosed herein.

The modulated manner targets the formation of a brine-based drilling fluid that comprises a semi-solid lubricant that adheres to downhole surfaces and substantially remains downhole during the drilling operation. In an embodiment, this modulated manner involves use of the lubricant blend as disclosed herein to promote formation of the semi-solid lubricant. In an embodiment, this modulated manner involves conditions or characteristics of the produced water or brine, such as pH, calcium concentration, magnesium concentration, or any combination thereof. In an embodiment, this modulated manner involves adjusting the quantity of lubricant blend added to the produced water or brine based on monitoring of torque of the drill string, monitoring for lubricant returned to surface in the produced water or brine, or any combination thereof. In an embodiment, this modulated manner involves adjusting the quantity of brine-based drilling fluid delivered downhole based on monitoring of torque of the drill string, monitoring for lubricant returned to surface in the produced water or brine, or any combination thereof. In an embodiment, this modulated manner includes any one of these components or any combination thereof.

The step of combining the produced water or brine having an alkaline pH and the lubricant blend may be performed in any suitable manner. In an embodiment, the lubricant blend is added to the produced water or brine in a brine suction tank. In an embodiment, the lubricant blend is added to the produced water or brine with a pipe, a stinger line, or a suction line. In an embodiment, the lubricant blend is added in a drop-wise manner. In an embodiment, the lubricant blend is added in a slow stream of liquid.

In an embodiment, the rate of addition and/or concentration of the lubricant blend in the produced water or brine may be adjusted during the drilling operation, based for example on monitoring of the torque of the drill string and/or the presence of lubricant in produced water or brine returning to surface. Thus, in contrast to some methods, there is not a set lubricant concentration target. Also, the rate of addition may change. Indeed, it has been observed in field trials that the lubricant blend and methods herein are highly effectively and changes in the amount of lubricant blend can be made frequently to maintain a desired torque in a cost effective manner. Also, the amount of lubricant blend of the present disclosure required to achieve effective reductions in torque has been found to be less than conventional lubricants in wells having similar characteristics and run under similar conditions.

In an embodiment, and without limitation, the lubricant blend may be added to or combined with the produced water or brine at a rate of between about 2-500 L/hour, or more or less, when the brine-based drilling fluid is being delivered downhole at a rate of between about 1.0-1.5 $m^3$/minute, and more particularly between about 1.0-1.2 $m^3$/minute. Advantageously, however, it has been found that a lubricant blend of the present disclosure can in certain embodiments be used in lower amounts (e.g. slower rates of addition) than conventional lubricants.

In an embodiment, and without limitation, the lubricant blend may be added to or combined with the produced water or brine at a rate of between about 5-100 L/hour, when the brine-based drilling fluid is being delivered downhole at a rate of between about 1.0-1.5 $m^3$/minute. In an embodiment, more particularly between 1.0-1.2 $m^3$/minute.

In an embodiment, and without limitation, the lubricant blend may be added to or combined with the produced water or brine at a rate of between about 8-50 L/hour, when the brine-based drilling fluid is being delivered downhole at a rate of between about 1.0-1.5 $m^3$/minute. In an embodiment, more particularly between 1.0-1.2 $m^3$/minute.

In an embodiment, and without limitation, the lubricant blend may be added to or combined with the produced water or brine at a rate of between about 20-40 L/hour, when the brine-based drilling fluid is being delivered downhole at a rate of between about 1.0-1.5 $m^3$/minute. In an embodiment, more particularly between 1.0-1.2 $m^3$/minute.

In an embodiment, and without limitation, the lubricant blend may be added to or combined with the produced water or brine at an amount of between about 0.0025% and about 0.75% by volume of lubricant in the brine-based drilling fluid.

In an embodiment, and without limitation, the lubricant blend may be added to or combined with the produced water or brine at an amount of between about 0.005% and about 0.15% by volume of lubricant in the brine-based drilling fluid.

In an embodiment, and without limitation, the lubricant blend may be added to or combined with the produced water or brine at an amount of between about 0.01% and about 0.1% by volume of lubricant in the brine-based drilling fluid.

In an embodiment, and without limitation, the lubricant blend may be added to or combined with the produced water or brine at an amount of between about 0.025% and about 0.05% by volume of lubricant in the brine-based drilling fluid.

The step of delivering the brine-based drilling fluid downhole is performed in accordance with known methods and existing technologies used in drilling operations. However, the quantity of brine-based drilling fluid delivered downhole may be modulated and adjusted in accordance with the methods herein, for example based on monitoring of the torque of the drill string and/or the presence of lubricant in produced water or brine returning to surface. More commonly, however, the concentration of lubricant blend added to the produced water or brine to form the brine-based drilling fluid would be adjusted, rather than adjusting the pump rate.

Monitoring torque of a drill string during downhole drilling operations is common practice. However, for the methods disclosed herein, the monitoring is for the additional purpose of promoting the formation of the semi-solid lubricant within the brine-based drilling fluid. If the torque of the drill string exceeds a desired threshold, the methods herein involve adding an increased quantity or flow rate of lubricant blend to the produced water or brine to stimulate formation of the semi-solid lubricant. In contrast, if the torque on the drill string drops below a desired threshold, the methods herein involve adding a decreased quantity or flow rate of lubricant blend to the produced water to impede formation of the semi-solid lubricant within the produced water or brine.

In essence, in an embodiment, the modulated manner as employed in the methods herein comprises adding the lubricant blend to the produced water or brine at an amount sufficient to optimize or enhance saponification between divalent cations in the produced water or brine and the free fatty acids in the lubricant blend to form the semi-solid lubricant. If increased saponification is desired to promote formation of the semi-solid lubricant, the amount of lubricant blend added to the produced water or brine may be increased, or vice versa.

Likewise, in an embodiment, the modulated manner as employed in the methods herein comprises adding the lubricant blend to the produced water or brine at an amount sufficient to optimize or enhance affinity of the semi-solid lubricant within the brine-based drilling fluid to adhere to the downhole surfaces. If semi-solid lubricant is observed in the produced water that returns to the surface, then it is not being sufficiently depleted downhole, indicating that an unnecessary excess quantity of lubricant blend is being added to the produced water or brine. To improve efficiency and avoid issues with solids, the amount of lubricant blend added to the produced water or brine may thus be decreased.

Likewise, in an embodiment, the modulated manner as employed in the methods herein comprises adding the lubricant blend to the produced water or brine at an amount sufficient to provide the semi-solid lubricant with a desired downhole viscosity.

As described, embodiments of the methods herein may involve adjusting the quantity of lubricant blend added to produced water or brine based on excess lubricant observed in the recovered produced water or brine. Thus, in an embodiment, the methods herein further comprise a step of monitoring the produced water or brine during the drilling operation for inclusion of excess lubricant that is returned to the surface. Such methods and procedures for such monitoring exist and could be employed by a skilled person for the purpose disclosed herein have regard to the present disclosure.

Without being bound to a particular theory, it is believed that the advantageous lubricant blends herein, and their improved tolerance to produced water and brine having alkaline pH, high calcium concentrations and/or high magnesium concentrations, enable the methods disclosed herein for improving lubricity during drilling operations. In an embodiment, produced water or brine has a calcium concentration of at least 500 mg/L. In an embodiment, produced water or brine has a calcium concentration of at least 1000 mg/L. In an embodiment, produced water or brine has a calcium concentration of at least 5000 mg/L. In an embodiment, produced water or brine has a pH of at least 8.0. In an embodiment, produced water or brine has a pH of at least 9.0. In an embodiment, produced water or brine has a pH of at least 10.5. In an embodiment, produced water or brine has a magnesium concentration of at least 250 mg/L. In an embodiment, produced water or brine has a magnesium concentration of at least 500 mg/L. In an embodiment, produced water or brine has a magnesium concentration of at least 1000 mg/L. In an embodiment, produced water or brine has a magnesium concentration of at least 5000 mg/L. In an embodiment, the produced water or brine has a pH of at least 9.0 and a calcium concentration of at least 1000 mg/L.

As described, certain embodiments of the methods herein encompass the use of a lubricant blend. The lubricant blend used in the methods herein may be any lubricant blend as disclosed herein.

In an embodiment, the lubricant blend used in the methods herein for improving lubricity in a wellbore during drilling operations, comprises between about 80% and about 99% by weight fatty acid and between about 1% and about 10% by weight dispersant. In an embodiment, the lubricant blend comprises a fatty acid:dispersant ratio of about 95:5 by weight.

In an embodiment, the fatty acids comprise at least 60% by weight saturated or mono-unsaturated fatty acids. In an embodiment, the fatty acids comprise between about 10% and 100% by weight oleic acid. In an embodiment, the fatty acids comprise at least 40% by weight oleic acid. In an embodiment, the fatty acids comprise at least 60% by weight oleic acid. In an embodiment, the fatty acids comprise at least 65%, at least 70%, at least 75%, at least 80%, at least 85%, at least 90%, at least 95%, or at least 99% by weight oleic acid. In an embodiment, the fatty acids consist of oleic acid. In an embodiment, the fatty acids comprise between about 60% and 100% by weight oleic acid. In an embodiment, the fatty acids comprise between about 60% and about 90% by weight oleic acid. In an embodiment, the fatty acids comprise between about 60% and about 80% by weight oleic acid. In an embodiment, the fatty acids comprise between about 70% and about 80% by weight oleic acid. In an embodiment, in addition to the oleic acid, the source of fatty acids comprises palmitic acid (C16:0), stearic acid (C18:0), palmitoleic acid (C16:0), linoleic acid (C18:2), linolenic acid (C18:3), or any combination thereof.

In an embodiment, the dispersant comprises a fatty imidazoline ethyl-sulfate quaternary. In an embodiment, the dispersant comprises or is 1:1 TOFA-AEEA imidazoline quaternized with diethylsulfate.

In an embodiment, the lubricant blend used in the methods herein for improving lubricity in a wellbore during drilling operations, comprises between about 60% and about 80% by weight oleic acid; and between about 0.1% and about 10% by weight fatty imidazoline ethyl-sulfate quaternary.

In an embodiment, the lubricant blend used in the methods herein for improving lubricity in a wellbore during drilling operations, comprises about 95% by weight fatty acids, the fatty acids comprising at least 60% by weight oleic acid; and about 5% by weight dispersant being 1:1 TOFA-AEEA imidazoline quaternized with diethylsulfate.

In an embodiment, the lubricant blend used in the methods herein for improving lubricity in a wellbore during drilling operations, comprises less than 5%, less than 4%, less than 3%, less than 2%, or less than 1% solvent. In an embodiment, the lubricant blend used in the methods herein for improving lubricity in a wellbore during drilling operations, is free of solvent. In an embodiment, the solvent may be any solvent that inhibits the emulsifying capability of the lubricant blend in the produced water or brine and/or inhibits the formation of the semi-solid lubricant. In an embodiment, and without limitation, the solvent is methanol or ethanol.

In an embodiment, the lubricant blend used in the methods herein for improving lubricity in a wellbore during drilling operations, comprises less than 5%, less than 4%, less than 3%, less than 2%, or less than 1% of a de-foamer. In an embodiment, the lubricant blend used in the methods herein for improving lubricity in a wellbore during drilling operations, is free of a de-foamer.

Lubricant Blends & Drilling Fluids

In an embodiment, the present disclosure provides a lubricant blend having improved tolerance to a brine-based drilling fluid having an alkaline pH, the lubricant blend comprising or consisting of: at least one source of free fatty acids; and a dispersant.

Embodiments of the at least one source of free fatty acids and the dispersant have been described elsewhere herein and any of these may used in the lubricant blend of the present disclosure, without limitation.

In an embodiment of the lubricant blends, the at least one source of free fatty acids is a vegetable oil, an animal fat, biodiesel, one or more fatty acids, one or more fatty acid esters, or any combination thereof. In an embodiment, the at least one source of free fatty acids is vegetable oil.

In an embodiment of the lubricant blends, the at least one source of free fatty acids is a mixture of vegetable oil and one or more fatty acids, such as for example a mixture of canola oil and oleic acid. In an embodiment, the mixture comprises a ratio of between about 10:1 and 1:10 by weight of canola oil:oleic acid. In an embodiment, the mixture comprises a ratio of between about 5:1 and 1:5 by weight of canola oil:oleic acid. In an embodiment, the mixture comprises a ratio of between about 2:1 and 1:2 by weight of canola oil:oleic acid. In an embodiment, the mixture comprises a ratio of about 1:1 by weight of canola oil:oleic acid.

In an embodiment of the lubricant blends, the dispersant is a cationic dispersant. In an embodiment, the dispersant comprises an imidazoline. In an embodiment, the dispersant comprises a fatty imidazoline ethyl-sulfate quaternary, such as for example tall oil ethylsulfate quaternary. In an embodiment, the dispersant comprises or is 1:1 TOFA-AEEA imidazoline quaternized with diethylsulfate, such as for example TOA 80DQ (StarChem™; Ontario, Canada).

In some embodiments, the lubricant blend of the present disclosure may comprise: between about 40% and about 60% by weight vegetable oil, such as for example canola oil; between about 40% and about 60% by weight free fatty acid, such as for example oleic acid; and between about 0.1% and about 10% by weight of an imidazoline dispersant, such as for example fatty imidazoline ethyl-sulfate quaternary (e.g. TOA 80DQ). In more particular embodiments, the lubricant blend comprises: between about 45% and about 55% by weight vegetable oil, such as for example canola oil; between about 45% and about 55% by weight free fatty acid, such as for example oleic acid; and between about 0.5% and about 5% by weight imidazoline dispersant, such as for example fatty imidazoline ethyl-sulfate quaternary (e.g. TOA 80DQ). In some embodiments, the lubricant blend of the present disclosure may comprise between about 50% and about 99.9% by weight fatty acids. In an embodiment, the lubricant blend comprises between about 60% and about 95%, between about 70% and about 95%, or between about 80% and about 95% by weight fatty acids. In an embodiment, the lubricant blend of the present disclosure comprises about 50%, about 55%, about 60%, about 65%, about 70%, about 75%, about 80%, about 85%, about 90%, or about 95% by weight fatty acids.

In an embodiment, the fatty acids in the lubricant blend of the present disclosure comprise at least 50%, at least 55%, at least 60%, at least 65%, at least 70%, at least 75%, at least 80%, at least 85%, at least 90%, or at least 95% by weight saturated or mono-saturated fatty acids. In an embodiment, the fatty acids in the lubricant blend of the present disclosure comprise at least 50%, at least 55%, at least 60%, at least 65%, at least 70%, at least 75%, at least 80%, at least 85%, at least 90%, or at least 95% by weight oleic acid. In an embodiment, the fatty acids in the lubricant blend of the present disclosure comprise between about 50% and about 90%, between about 60% and about 80%, or between about 70% and about 90% by weight oleic acid.

In some embodiments, the lubricant blend of the present disclosure may comprise or consist of: between about 60% and about 99.9% by weight fatty acids, such as for example oleic acid as all or a majority (>50%) of the fatty acids; and between about 0.1% and about 10% by weight fatty imidazoline ethyl-sulfate quaternary.

In some embodiments, the lubricant blend of the present disclosure may comprise or consist of: between about 90% and about 95% by weight fatty acids, such as for example oleic acid as all or a majority (>50%) of the fatty acids; and between about 5% and about 10% by weight fatty imidazoline ethyl-sulfate quaternary.

In some embodiments, the lubricant blend of the present disclosure may comprise or consist of: about 95% by weight fatty acids, the fatty acids comprising at least 60% by weight oleic acid; and about 5% by weight dispersant being 1:1 TOFA-AEEA imidazoline quaternized with diethylsulfate. In an embodiment, the fatty acids comprise between about 60% and about 90% oleic acid, more particularly between about 70% and about 80% oleic acid.

As mentioned above, some embodiments of the methods herein employ the lubricant blend as described herein to add both the dispersant and the at least one source of free fatty acids to the produced water or brine in a single step to form the brine-based drilling fluid. In other embodiments, the components may be added separately.

Irrespective of the manner of addition, the present disclosure further provides brine-based drilling fluids prepared from any one or more of the lubricant blends disclosed herein. In an embodiment, the brine-based drilling fluid comprises a produced water or brine having a threshold divalent cation concentration and an alkaline pH; and a lubricant blend of the present disclosure.

In an embodiment, the produced water or brine used to make the brine-based drilling fluid, and the resulting drilling fluid itself, have a pH of at least 8.0, at least 8.5, at least 9.0, at least 9.5, at least 10.0, at least 10.5, or at least 11.0.

In an embodiment, the produced water or brine used to make the brine-based drilling fluid, and the resulting drilling fluid itself, have a threshold divalent cation concentration of at least 1000 mg/L, 2500 mg/L, 5000 mg/L, 10,000 mg/L, or more.

In an embodiment, the produced water or brine used to make the brine-based drilling fluid, and the resulting drilling fluid itself, have a calcium concentration of at least 250 mg/L, at least 500 mg/L, at least 1000 mg/L, 2500 mg/L, 5000 mg/L, or more.

In an embodiment, the produced water or brine used to make the brine-based drilling fluid, and the resulting drilling fluid itself, have a calcium concentration of at least 250 mg/L, at least 500 mg/L, at least 1000 mg/L, at least 5000 mg/L, or more.

In any of the embodiments of brine-based drilling fluids herein, the produced water or brine may naturally comprise the stated pH or divalent cation concentration, or the produced water of brine may be adjusted to have that pH or divalent cation concentration, preferably prior to addition of the lubricant blend. This may include, for example, the addition of extraneous sources of calcium and magnesium.

It has surprisingly been found that the lubricant blends herein exhibit tolerance to produced water and brine having a threshold divalent cation concentration and an alkaline pH, and provide an effective brine-based drilling fluid with advantageous lubrication properties.

Without being bound by theory, it is believed that the dispersant as described herein, as well as the divalent cations in the produced water or brine, independently and/or in combination have advantageous properties in providing brine-based drilling fluids with an improved tolerance to the lubricants as described herein (e.g. fatty acid lubricants). By "improved tolerance", it is meant more compatible with and/or dispersible within the produced water or brine having an alkaline pH, and thereby more effective in increasing lubricity of the brine-based drilling fluid produced therefrom. In an embodiment, within the brine-based drilling fluid of the present disclosure, at least 35%, at least 40%, at least 45%, at least 50%, at least 55%, at least 60%, at least 65%, at least 70%, at least 75%, at least 80%, at least 85%, at least 90%, at least 95%, or more of fatty acid salts are in the form of calcium oleate.

In some embodiments, the lubricant blend herein exhibits improved tolerance to a brine-based drilling fluid having a pH of at least 8.0, more particularly a pH of at least 9.0, and more particularly still a pH of at least 10.5. In any of these embodiments, the threshold divalent cation concentration may be at least 1000 mg/L, at least 2500 mg/L, at least 5000 mg/L, at least 10,000 mg/L, or more. In any of these embodiments, the cation concentration may be at least 250 mg/L, at least 500 mg/L, at least 1000 mg/L, at least 2500 mg/L, at least 5000 mg/L, or more. In any of these embodiments, the magnesium concentration may be at least 250 mg/L, at least 500 mg/L, at least 1000 mg/L, at least 5000 mg/L, or more.

In some embodiments, the lubricant blend herein exhibits improved tolerance to a brine-based drilling fluid having a pH of at least 9.0 and a threshold divalent cation concentration of a least 1000 mg/L. In some embodiments, the pH is at least 10.5.

In some embodiments, the lubricant blend herein exhibits improved tolerance to a brine-based drilling fluid having a calcium concentration of at least 250 mg/L and a pH of at least 9.0. In some embodiments, the lubricant blend herein exhibits improved tolerance to a brine-based drilling fluid having a calcium concentration of at least 500 mg/L and a pH of at least 9.0. In some embodiments, the calcium concentration is at least 1000 mg/L, at least 5000 mg/L, or more.

Kit-of-Parts

The present disclosure further relates to a kit or a kit-of-parts comprising one or more components of the present disclosure (e.g. a source of free fatty acids, a dispersant, a lubricant blend, etc.).

In an embodiment, there is provided a kit comprising (i) at least one source of free fatty acids; and (ii) a dispersant. In an embodiment, the source of free fatty acids and dispersant may be provided together within the kit as a lubricant blend within the same container. In an embodiment, the source of the free fatty acids and the dispersant may be provided in separate containers. Furthermore, if there is more than one source of the free fatty acids, the individual sources may be provided in separate containers or together in the same container. In an embodiment, the container is a drum or barrel. In an embodiment, the kit further comprises instructions for use of the provided components (e.g. source of free fatty acids, dispersant, lubricant blend, etc.) in preparing a brine-based drilling fluid comprising a semi-solid lubricant.

In an embodiment, the present disclosure thus relates to a kit comprising (i) at least one source of free fatty acids; (ii) a dispersant; and (iii) instructions for use in preparing a brine-based drilling fluid comprising a semi-solid lubricant using the least one source of free fatty acids, the dispersant, and a produced water or brine having a threshold divalent cation concentration and an alkaline pH.

In an embodiment, the present disclosure relates to a kit comprising (i) a lubricant blend; and (ii) instructions for use in preparing a brine-based drilling fluid comprising a semi-solid lubricant using the lubricant blend and a produced water or brine having a threshold divalent cation concentration and an alkaline pH.

In respect of the kits herein, the at least one source of the one or more free fatty acids, the dispersant, or the lubricant blend may be any of those as disclosed elsewhere herein. Likewise, the produced water or brine used to prepare the brine-based drilling fluid using the components of the kit may be any such produced water or brine as described herein.

In an embodiment of the kits herein, the at least one source of free fatty acids comprises at least 60% oleic acid. In an embodiment of the kits herein, the dispersant comprises a fatty imidazoline ethyl-sulfate quaternary. In an embodiment of the kits herein, the dispersant comprises or is 1:1 TOFA-AEEA imidazoline quaternized with diethyl-sulfate.

In an embodiment, the kits herein are used with a produced water or brine having a pH of at least 9.0 and a threshold divalent cation concentration of at least 1000 mg/L.

The instructions contained within embodiments of the kits herein provide guidance and instructions to a user (e.g. an operator) to promote the formation of the semi-solid lubricant. For example, the instructions may include without limitation guidance on rates of addition, amounts of the source of free fatty acids, amounts of the dispersant, and feedback on adjustments to be made to optimize formation of the semi-solid lubricant, including adjustments to lubricant amounts and/or drilling operation parameters.

In an embodiment of the kits herein, the instructions instruct a user to prepare a lubricant blend comprising between about 60% and about 99.9% by weight fatty acids; and between about 0.1% and about 10% by weight of the dispersant.

In an embodiment of the kits herein, the instructions instruct the user to prepare the lubricant blend to comprise between about 60% and about 80% by weight oleic acid; and between about 1% and about 10% by weight of the dispersant.

In an embodiment of the kits herein, the instructions instruct the user to prepare the lubricant blend to comprise about 95% by weight fatty acids, the fatty acids comprising at least 60% by weight oleic acid; and about 5% by weight dispersant being 1:1 TOFA-AEEA imidazoline quaternized with diethylsulfate.

Uses

The present disclosure further relates to uses of the lubricant blends disclosed herein.

In an embodiment, the present disclosure provides for the use of the lubricant blend as disclosed herein for improving the lubricity of a brine-based drilling fluid having an alkaline pH and a threshold divalent cation concentration. In some embodiments of the aforementioned use, the pH of the brine-based drilling fluid is at least 8.0, more particularly at least 9.0, and more particularly still at least 10.5. In some embodiments of the aforementioned use, the threshold divalent cation concentration is at least 1000 mg/L, at least 5000 mg/L, or more. In some embodiments of the aforementioned use, the calcium concentration is at least 250 mg/L, at least 500 mg/L, at least 1000 mg/L, at least 2500 mg/L, at least 5000 mg/L, or more. In some embodiments of the aforementioned use, the magnesium concentration is at least 250 mg/L, at least 500 mg/L, at least 1000 mg/L, at least 5000 mg/L, or more.

As shown in Example 3 herein, a lubricity performance study involving the methods and lubricant blends disclosed herein, and involving a produced water sample having a pH 10.5, a calcium concentration of 6990 mg/L and a magnesium concentration of 1200 mg/L, was advantageously capable of generating an 81.4% COF reduction in the brine-based drilling fluid thereby produced.

In another embodiment, the present disclosure relates to the use of the lubricant blend as disclosed herein for forming a semi-solid lubricant when delivered downhole in admixture with a produced water or brine having a threshold divalent cation concentration and an alkaline pH.

In experimental studies, as well as in the field trials, formation of a semi-solid lubricant within the brine-based drilling fluid has been observed. This semi-solid substance has effective lubricious properties, as well as other advantageous properties as described herein, in particular for lubricant blend embodiments comprising about 95% by weight fatty acids (>60% oleic acid) and a dispersant comprising a cationic fatty imidazoline ethyl-sulfate quaternary, namely TOA 80DQ as used in the examples herein.

EMBODIMENTS

The following are exemplary and non-limiting embodiments of the present disclosure:

(1) A method for increasing the lubricity of a brine-based drilling fluid having an alkaline pH, the method comprising: providing a produced water or a brine having a threshold divalent cation concentration and an alkaline pH; adding to the produced water or brine at least one source of free fatty acids; and optionally, adding to the produced water or brine a dispersant.

(2) The method of (1), which includes the step of adding the dispersant to the produced water or brine.

(3) The method of (1) or (2), wherein the step of adding the at least one source of fatty acids to the produced water or brine is at an amount and/or rate sufficient to induce formation of a semi-solid lubricant within the brine-based drilling fluid.

(4) The method of any one of (1) to (3), wherein the threshold divalent cation concentration is at least 1000 mg/L.

(5) The method of any one of (1) to (4), wherein the threshold divalent cation concentration comprises a threshold magnesium concentration of at least 250 mg/L.

(6) The method of (5), wherein the threshold magnesium concentration is at least 500 mg/L.

(7) The method of (5), wherein the threshold magnesium concentration is at least 1000 mg/L.

(8) The method of (5), wherein the threshold magnesium concentration is at least 5000 mg/L.

(9) The method of any one of (1) to (8), wherein the step of providing the produced water or brine comprises a step of increasing the pH to above at least 7.0.

(10) The method of any one of (1) to (9), wherein the pH of the produced water or brine is at least 8.0. In an embodiment, the pH of the produced water or brine is at least 9.0.

(11) The method of (10), wherein the pH of the produced water or brine is at least 10.5.

(12) The method of any one of (1) to (11), wherein the threshold divalent cation concentration comprises a threshold calcium concentration of at least 250 mg/L. In an embodiment, the threshold divalent cation concentration comprises a threshold calcium concentration is at least 500 mg/L.

(13) The method of (12), wherein the threshold calcium concentration is at least 1000 mg/L.

(14) The method of (13), wherein the threshold calcium concentration is at least 5000 mg/L.

(15) The method of any one of (1) to (14), wherein the produced water or brine is brought to or above the threshold divalent cation concentration by adding magnesium and/or calcium, optionally prior to adding the dispersant and the at least one source of free fatty acids. In an embodiment, the produced water or brine is brought to or above the threshold divalent cation concentration by adding magnesium and/or calcium prior to adding the dispersant and the at least one source of free fatty acids.

(16) The method of any one of (1) to (15), wherein the at least one source of free fatty acids is a vegetable oil, an animal fat, one or more fatty acids, one or more fatty acid esters, or any combination thereof.

(17) The method of (16), wherein the at least one source of free fatty acids is the vegetable oil.

(18) The method of (16), wherein the at least one source of free fatty acids is a mixture of the vegetable oil and one or more fatty acids.

(19) The method of (18), wherein the mixture is the vegetable oil and oleic acid.

(20) The method of (19), wherein the mixture comprises a ratio of about 1:1 by weight of canola oil:oleic acid.

(21) The method of (16), wherein the at least one source of free fatty acids comprises at least 60% by weight oleic acid.

(22) The method of any one of (1) to (21), wherein the dispersant is a cationic dispersant.

(23) The method of any one of (1) to (22), wherein the dispersant comprises an imidazoline.

(24) The method of any one of (1) to (23), wherein the dispersant comprises a fatty imidazoline ethyl-sulfate quaternary.

(25) The method of any one of (1) to (24), wherein the dispersant comprises or is 1:1 TOFA-AEEA imidazoline quaternized with diethylsulfate.

(26) The method of any one of (1) to (25), wherein the dispersant is added to the produced water or brine prior to the at least one source of free fatty acids.

(27) The method of any one of (1) to (25), wherein the dispersant and the at least one source of free fatty acids are added to the produced water or brine together in a lubricant blend.

(28) The method of (27), wherein the lubricant blend comprises: between about 40% and about 60% by weight vegetable oil; between about 40% and about 60% by weight oleic acid; and between about 0.1% and about 10% by weight fatty imidazoline ethyl-sulfate quaternary.

(29) The method of (28), wherein the lubricant blend comprises: between about 45% and about 55% by weight canola oil; between about 45% and about 55% by weight oleic acid; and between about 0.5% and about 5% by weight 1:1 TOFA-AEEA imidazoline quaternized with diethylsulfate.

(30) The method of (27), wherein the lubricant blend comprises: between about 60% and about 80% by weight oleic acid; and between about 0.1% and about 10% by weight fatty imidazoline ethyl-sulfate quaternary.

(31) The method of (27), wherein the lubricant blend comprises: about 95% by weight fatty acids, the fatty acids comprising at least 60% by weight oleic acid; and about 5% dispersant being 1:1 TOFA-AEEA imidazoline quaternized with diethylsulfate.

(32) A lubricant blend having improved tolerance to a brine-based drilling fluid having an alkaline pH, the lubricant blend comprising: at least one source of free fatty acids; and a dispersant.

(33) The lubricant blend of (32), wherein the at least one source of free fatty acids is a vegetable oil, an animal fat, one or more fatty acids, one or more fatty acid esters, or any combination thereof.

(34) The lubricant blend of (33), wherein the at least one source of free fatty acids is the vegetable oil.

(35) The lubricant blend of (33), wherein the at least one source of free fatty acids is a mixture of the vegetable oil and one or more fatty acids.

(36) The lubricant blend of (35), wherein the mixture is canola oil and oleic acid.

(37) The lubricant blend of (36), wherein the mixture comprises a ratio of about 1:1 by weight of canola oil:oleic acid.

(38) The lubricant blend of (32) or (33), wherein the at least one source of free fatty acids comprises at least 60% by weight oleic acid.

(39) The lubricant blend of any one of (32) to (38), wherein the dispersant is a cationic dispersant.

(40) The lubricant blend of any one of (32) to (39), wherein the dispersant comprises an imidazoline.

(41) The lubricant blend of any one of (32) to (40), wherein the dispersant comprises a fatty imidazoline ethyl-sulfate quaternary.

(42) The lubricant blend of any one of (32) to (41), wherein the dispersant comprises or is 1:1 TOFA-AEEA imidazoline quaternized with diethylsulfate.

(43) The lubricant blend of any one of (32) to (42), which comprises: between about 40% and about 60% by weight vegetable oil; between about 40% and about 60% by weight oleic acid; and between about 0.1% and about 10% by weight fatty imidazoline ethyl-sulfate quaternary.

(44) The lubricant blend of (43), which comprises: between about 45% and about 55% by weight canola oil; between about 45% and about 55% by weight oleic acid; and between about 0.5% and about 5% by weight 1:1 TOFA-AEEA imidazoline quaternized with diethylsulfate.

(45) The lubricant blend of any one of (32) to (42), which comprises: between about 60% and about 80% by weight oleic acid; and between about 0.1% and about 10% by weight fatty imidazoline ethyl-sulfate quaternary.

(46) The lubricant blend of (45), which comprises: about 95% by weight fatty acids, the fatty acids comprising at least 60% by weight oleic acid; and about 5% by weight dispersant being 1:1 TOFA-AEEA imidazoline quaternized with diethylsulfate.

(47) The lubricant blend of any one of (32) to (46), which exhibits improved tolerance to a brine-based drilling fluid having a pH of at least 9.0 and a threshold divalent cation concentration of at least 1000 mg/L.

(48) The lubricant blend of any one of (32) to (46), which exhibits improved tolerance to a brine-based drilling fluid having a pH of at least 10.5 and a threshold divalent cation concentration of at least 1000 mg/L.

(49) The lubricant blend of any one of (32) to (46), which exhibits improved tolerance to a brine-based drilling fluid having a calcium concentration of at least 500 mg/L and a pH of at least 9.0.

(50) The lubricant blend of any one of (32) to (46), which exhibits improved tolerance to a brine-based drilling fluid having a calcium concentration of at least 1000 mg/L and a pH of at least 10.5.

(51) The lubricant blend of any one of (32) to (46), which exhibits improved tolerance to a brine-based drilling fluid having a calcium concentration of at least 5000 mg/L and a pH of at least 10.5.

(52) Use of the lubricant blend of any one of (32) to (51) for improving the lubricity of a brine-based drilling fluid having an alkaline pH and a threshold divalent cation concentration.

(53) The use according to (52), wherein the threshold divalent cation concentration is at least 1000 mg/L.

(54) The use according to (52) or (53), wherein the threshold divalent cation concentration comprises a calcium concentration of at least 1000 mg/L.

(55) The use according to (52) or (53), wherein the threshold divalent cation concentration comprises a calcium concentration of at least 5000 mg/L.

(56) The use according to any one of (52) to (55), wherein the threshold divalent cation concentration comprises a magnesium concentration of at least 1000 mg/L.

(57) The use according any one of (52) to (56), wherein the pH of the brine-based drilling fluid is at least 9.0.

(58) The use according to (57), wherein the pH of the brine-based drilling fluid is at least 10.5.

(59) Use of the lubricant blend of (46), for forming a semi-solid lubricant when delivered downhole in admixture with a produced water or brine having a threshold divalent cation concentration and an alkaline pH.

(60) A brine-based drilling fluid comprising: a produced water or a brine having a threshold divalent cation concentration and an alkaline pH; and a lubricant blend of any one of (32) to (51).

(61) The brine-based drilling fluid of (60), wherein the threshold divalent cation concentration comprises a threshold magnesium concentration is at least 250 mg/L.

(62) The brine-based drilling fluid of (61), wherein the threshold magnesium concentration is at least 500 mg/L.

(63) The brine-based drilling fluid of (61), wherein the threshold magnesium concentration is at least 1000 mg/L.

(64) The brine-based drilling fluid of (61), wherein the threshold magnesium concentration is at least 5000 mg/L.

(65) The brine-based drilling fluid of any one of (61) to (64), further comprising an extraneous source of magnesium to provide the produced water or brine with the threshold magnesium concentration.

(66) The brine-based drilling fluid of any one of (60) to (65), wherein the pH of the produced water or brine is at least 8.0.

(67) The brine-based drilling fluid of (66), wherein the pH of the produced water or brine is at least 9.0.

(68) The brine-based drilling fluid of (67), wherein the pH of the produced water or brine is at least 10.5.

(69) The brine-based drilling fluid of any one of (60) to (68), wherein the threshold divalent cation concentration comprises a threshold calcium concentration of at least 500 mg/L.

(70) The brine-based drilling fluid of (69), wherein the threshold calcium concentration is at least 1000 mg/L.

(71) The brine-based drilling fluid of (70), wherein the threshold calcium concentration is at least 5000 mg/L.

(72) The brine-based drilling fluid of (71), wherein the lubricant blend comprises: about 95% by weight fatty acids, the fatty acids comprising at least 60% by weight oleic acid; and about 5% dispersant being 1:1 TOFA-AEEA imidazoline quaternized with diethylsulfate.

(73) The brine-based drilling fluid of any one of (60) to (72), wherein at least 75% of fatty acid salts in the brine-based drilling fluid are in the form of calcium oleate.

(74) A method for improving lubricity in a wellbore during drilling operations, the method comprising: combining at surface, in a modulated manner, (i) a quantity of a produced water or brine having a threshold divalent cation concentration and/or an alkaline pH and (ii) a quantity of a lubricant blend comprising at least one source of free fatty acids and a dispersant, wherein the modulated manner targets the formation of a brine-based drilling fluid that comprises a semi-solid lubricant that adheres to downhole surfaces and substantially remains downhole during the drilling operation; and delivering downhole the brine-based drilling fluid, wherein the modulated manner comprises adding the lubricant blend to the produced water or brine at an amount sufficient to: promote saponification between divalent cations in the produced water or brine and the free fatty acids in the lubricant blend to form the semi-solid lubricant; and/or promote affinity of the semi-solid lubricant to adhere to the downhole surfaces.

(75) The method of (74), further comprising a step of monitoring torque of a drill string during downhole delivery of the brine-based drilling fluid, and adjusting the quantity of the lubricant blend that is combined with the produced water or brine based on a desired torque of the drill string.

(76) The method of (75), wherein if the torque of the drill string increases beyond the desired torque, the quantity of lubricant blend used to prepare the brine-based drilling fluid is increased.

(77) The method of any one of (74) to (76), further comprising a step of monitoring the produced water or brine during the drilling operation for inclusion of excess lubricant that is returned to the surface.

(78) The method of (77), wherein if excess lubricant is identified in the produced water or brine, the quantity of lubricant blend used to prepare the brine-based drilling fluid is decreased.

(79) The method of any one of (74) to (76), wherein the lubricant blend comprises between about 60% and about 99% by weight fatty acid.

(80) The method of any one of (74) to (79), wherein the lubricant blend comprises between about 0.1% and about 10% by weight dispersant.

(81) The method of any one of (74) to (80), wherein the lubricant blend comprises a fatty acid:dispersant ratio of about 95:5 by weight.

(82) The method of any one of (74) to (81), wherein the fatty acids comprise at least 60% by weight saturated or mono-unsaturated fatty acids.

(83) The method of any one of (74) to (82), wherein the fatty acids comprise at least 60% by weight of oleic acid.

(84) The method of (83), wherein the fatty acids comprise between about 70% and about 80% by weight of oleic acid.

(85) The method of any one of (74) to (84), wherein the dispersant comprises a fatty imidazoline ethyl-sulfate quaternary.

(86) The method of any one of (74) to (85), wherein the dispersant comprises or is 1:1 TOFA-AEEA imidazoline quaternized with diethylsulfate.

(87) The method of any one of (74) to (86), wherein the lubricant blend comprises: between about 40% and about 60% by weight vegetable oil; between about 40% and about 60% by weight oleic acid; and between about 0.1% and about 10% by weight fatty imidazoline ethyl-sulfate quaternary.

(88) The method of (87), wherein the lubricant blend comprises: between about 45% and about 55% by weight canola oil; between about 45% and about 55% by weight oleic acid; and between about 0.5% and about 5% by weight 1:1 TOFA-AEEA imidazoline quaternized with diethylsulfate.

(89) The method of any one of (74) to (86), wherein the lubricant blend comprises: between about 60% and about 80% by weight oleic acid; and between about 0.1% and about 10% by weight fatty imidazoline ethyl-sulfate quaternary.

(90) The method of (89), wherein the lubricant blend comprises: about 95% by weight fatty acids, the fatty acids comprising at least 60% by weight oleic acid; and about 5% by weight dispersant being 1:1 TOFA-AEEA imidazoline quaternized with diethylsulfate.

(91) The method of any one of (74) to (90), wherein the threshold divalent cation concentration comprises a threshold magnesium concentration of at least 250 mg/L.

(92) The method of (91), wherein the threshold magnesium concentration is at least 500 mg/L.

(93) The method of (91), wherein the threshold magnesium concentration is at least 1000 mg/L.

(94) The method of (91), wherein the threshold magnesium concentration is at least 5000 mg/L.

(95) The method of any one of (74) to (94), wherein the pH of the produced water or brine is at least 9.0.

(96) The method of (95), wherein the pH of the produced water or brine is at least 10.5.

(97) The method of any one of (74) to (96), wherein the threshold divalent cation concentration comprises a threshold calcium concentration of at least 500 mg/L.

(98) The method of (97), wherein the threshold calcium concentration is at least 1000 mg/L.

(99) The method of (97), wherein the threshold calcium concentration is at least 5000 mg/L.

(100) The method of any one of (74) to (94), wherein the produced water or brine has a pH of at least 9.0 and a calcium concentration of at least 1000 mg/L.

(101) The method of any one of (74) to (100), wherein the lubricant blend is combined with the produced water at between about 8 L/hour and about 50 L/hour, when the brine-based drilling fluid is being delivered downhole at a rate of between about 1.0-1.5 m$^3$/minute.

(102) The method of any one of (74) to (101), wherein the lubricant blend is combined with the drilling fluid at between about 20 L/hour and about 40 L/hour, when the lubrication fluid is being delivered downhole at a rate of between about 1.0-1.5 m$^3$/minute.

(103) The method of any one of (74) to (102), wherein the lubricant blend comprises less than 5% by weight or is free of solvent.

(104) The method of (103), wherein the solvent is methanol or ethanol.

(105) The method of any one of (74) to (104), wherein the lubricant blend comprises less than 5% by weight or is free of a de-foamer.

(106) The method of any one of (74) to (105), wherein the lubricant blend is combined with the produced water or brine within a stinger line or suction line.

(107) A lubricant blend for forming a semi-solid lubricant when combined with a produced water or brine having an alkaline pH and a threshold divalent cation concentration, the lubricant blend comprising: between about 60% and about 80% oleic acid; and between about 1% and about 10% of 1:1 TOFA-AEEA imidazoline quaternized with diethylsulfate.

(108) The lubricant blend of (107), comprising about 95% by weight fatty acids, the fatty acids comprising at least 60% by weight oleic acid.

(109) The lubricant blend of (107) or (108), comprising about 5% of 1:1 TOFA-AEEA imidazoline quaternized with diethylsulfate.

(110) The lubricant blend of any one of (107) to (109), comprising about 65% oleic acid and about 5% of 1:1 TOFA-AEEA imidazoline quaternized with diethylsulfate.

(111) Use of the lubricant blend of any one of (107) to (110) for forming a semi-solid lubricant by combining the lubricant blend with a produced water or brine having a pH of at least 9.0 and a calcium concentration of at least 1000 mg/L.

(112) The use according to (111), wherein the semi-solid lubricant comprises viscosified fatty acid substantially comprising calcium oleate.

(113) A kit comprising (i) at least one source of free fatty acids; (ii) a dispersant; and (iii) instructions for use in preparing a brine-based drilling fluid comprising a semi-solid lubricant using the least one source of free fatty acids, the dispersant, and a produced water or brine having a threshold divalent cation concentration and an alkaline pH.

(114) The kit of (113), wherein the at least one source of free fatty acids comprises at least 60% oleic acid.

(115) The kit of (113) or (114), wherein the dispersant comprises a fatty imidazoline ethyl-sulfate quaternary.

(116) The kit of any one of (113) to (115), wherein the dispersant comprises or is 1:1 TOFA-AEEA imidazoline quaternized with diethylsulfate.

(117) The kit of any one of (113) to (116), wherein the produced water or brine has a pH of at least 9.0 and the threshold divalent cation concentration is at least 1000 mg/L.

(118) The kit of any one of (113) to (117), wherein the instructions instruct a user to prepare a lubricant blend comprising between about 60% and about 99.9% by weight fatty acids; and between about 0.1% and about 10% by weight of the dispersant.

(119) The kit of (118), wherein the instructions instruct the user to prepare the lubricant blend to comprise between about 60% and about 80% by weight oleic acid; and between about 1% and about 10% by weight of the dispersant.

(120) The kit of (118) or (119), wherein the instructions instruct the user to prepare the lubricant blend to comprise about 95% by weight fatty acids, the fatty acids comprising at least 60% by weight oleic acid; and about 5% by weight dispersant being 1:1 TOFA-AEEA imidazoline quaternized with diethylsulfate.

EXAMPLES

The following examples are presented to illustrate and demonstrate aspects of the disclosure and should not be construed as limiting.

Example 1

A produced water was provided having an adjusted pH of 10.3 and the following concentrations of various ions:

| Ion | Concentration |
|---|---|
| $Ca^{2+}$ | 6990 mg/L |
| $Mg^{2+}$ | 1200 mg/L |
| $Na^+$ | 41200 mg/L |
| $K^+$ | 940 mg/L |
| $Cl^-$ | 79800 mg/L |
| $SO_4^-$ | 600 mg/L |

To filtered and unfiltered samples of the produced water was performed the following dispersibility tests on lubricant blends: (#1) to a filtered sample of the produced water was added a lubricant comprising a 1:1 by weight ratio of vegetable oil and oleic acid; (#2) to an unfiltered sample of the produced water was added a lubricant comprising a 1:1 by weight ratio of vegetable oil and oleic acid; (#3) to a filtered sample of the produced water was added a lubricant blend comprising a 1:1 by weight ratio of vegetable oil and oleic acid, and a dispersant (5 L/m$^3$) comprising a cationic fatty imidazoline ethyl-sulfate quaternary, namely TOA 80DQ; and (#4) to an unfiltered sample of the produced water was added a lubricant blend comprising a 1:1 by weight ratio of vegetable oil and oleic acid, and a dispersant (5 L/m$^3$) comprising a cationic fatty imidazoline ethyl-sulfate quaternary, namely TOA 80DQ.

As shown in FIG. 1, in test #1 the lubricant was incompatible with the alkaline (pH 10.3) produced water (see panel A). In test #2, the presence of solids was able to contribute to dispersibility of the same lubricant in the alkaline produced water (see panel B). With the presence of a dispersant comprising a cationic fatty imidazoline ethyl-sulfate quaternary, in test #3 an improved dispersibility was observed for the lubricant blend (see panel C) as compared to test #1. However, an even better dispersion was observed in test #4 with the combination of solids and a dispersant comprising a cationic fatty imidazoline ethyl-sulfate quaternary in the lubricant blend.

Thus, the results show that a dispersant comprising a cationic fatty imidazoline ethyl-sulfate quaternary is an effective dispersant in a strongly alkaline (pH 10.3) produced water for a lubricant comprising a 1:1 by weight ratio of vegetable oil and oleic acid. The dispersant can be added directly to the produced water or brine prior to the addition of lubricant. Alternatively, it is compatible with the lubricant in a lubricant blend that is added to the strongly alkaline (pH 10.3) produced water or brine.

In the unfiltered alkaline produced water of tests #2 and #4, it is believed that divalent cations (e.g. magnesium) in the produced water influence and aid in the dispersion. Without being bound by theory, it is believed that divalent cations (e.g. magnesium) may be exerting their influence by having a suitable threshold concentration that sufficiently results in the formation of salts (e.g. magnesium salt) of fatty acids and/or sufficiently provides solid salt particles that stabilize dispersion of the lubricant. These effects are even more pronounced with the presence of a dispersant comprising a cationic fatty imidazoline ethyl-sulfate quaternary.

Example 2

An unfiltered laboratory prepared brine having a pH of 10.5 and consisting of 20% NaCl (ACS grade); 1000 mg/L $Mg^{2+}$ and 5000 mg/L $Ca^{2+}$ was prepared.

The dispersant capacity of three products was tested by adding each product separately to a sample of the brine at an amount of 2 $L/m^3$, mixing, and then adding a lubricant comprising a 1:1 by weight ratio of vegetable oil and oleic acid. The first product, TOA 80DQ, was found to exhibit excellent dispersant capacity for the lubricant in the alkaline brine. Relative to TOA 80DQ, the second product, BAP-75, was found to have poor dispersant capacity for the lubricant in the alkaline brine. Relative to TOA 80DQ, the third product, Amine C-6, was found to have moderate dispersant capacity for the lubricant in the alkaline brine.

The results indicate that a dispersant comprising an imidazoline is more effective in dispersing a vegetable oil/oleic acid lubricant in an alkaline brine than other test products.

Example 3

A produced water was provided having an adjusted pH of 10.5 and the following concentrations of various ions:

| Ion | Concentration |
| --- | --- |
| $Ca^{2+}$ | 6990 mg/L |
| $Mg^{2+}$ | 1200 mg/L |
| $Na^+$ | 41200 mg/L |
| $K^+$ | 940 mg/L |
| $Cl^-$ | 79800 mg/L |
| $SO_4^-$ | 600 mg/L |

Lubricity testing was performed using a OFITE EP Lubricity Tester. Measurements were collected at 60 rpm, 150 in·lb applied torque at room temperature. The fluids tested were: (1) Produced water having added a dispersant (5 $L/m^3$) comprising a cationic fatty imidazoline ethyl-sulfate quaternary, namely TOA 80DQ; (2) Produced water having added 2% by weight of an incumbent lubricant and a dispersant (5 $L/m^3$) comprising a cationic fatty imidazoline ethyl-sulfate quaternary, namely TOA 80DQ; and (3) Produced water having added 2% by weight of a lubricant comprising a 1:1 by weight ratio of vegetable oil and oleic acid, and a dispersant (5 $L/m^3$) comprising a cationic fatty imidazoline ethyl-sulfate quaternary, namely TOA 80DQ. The results are shown in the table below:

| Test | Coefficient of Friction (COF) | COF Reduction |
| --- | --- | --- |
| #1 | 0.118 | N/A |
| #2 | 0.062 | 47.5% |
| #3 | 0.022 | 81.4% |

The results show that a dispersant comprising a cationic fatty imidazoline ethyl-sulfate quaternary was effective in increasing the lubricity of a brine-based drilling fluid having a lubricant comprising a 1:1 by weight ratio of vegetable oil and oleic acid, to a significantly greater extent than a brine-based drilling fluid having an incumbent lubricant.

Example 4

Four preliminary field trials have been successfully conducted whereby the lubricity of an alkaline produced water (×2), an alkaline sodium chloride brine (×1), and an alkaline calcium chloride brine (×1) has been improved using a lubricant blend comprising a 1:1 by weight ratio of vegetable oil and oleic acid, and a dispersant comprising a cationic fatty imidazoline ethyl-sulfate quaternary, namely TOA 80DQ. Each of the produced water and the calcium chloride brine had a threshold magnesium concentration, which for produced water was tested at about 1200 mg/L and for the calcium chloride brine was >10,000 mg/L. The threshold magnesium concentration was not found necessary for the sodium chloride brine, which did not contain magnesium. The resultant brine-based drilling fluids had excellent lubricating capacities in drilling operations.

Example 5

Over 100 field trials have been successfully conducted with lubricant blends of the present disclosure, in accordance with the methods herein. It has been found that the lubricant blends and procedures of the present disclosure have outperformed existing lubricants and procedures on 100% of the field trials. The results have demonstrated that the lubricant blends of the present disclosure are tolerant to, if not activated by, high salinity environments with relatively high divalent cation concentrations (e.g. $Ca^{2+}/Mg^{2+}$>1000 mg/L) at alkaline pH.

Without being bound by theory, it is believed that the lubricant blends of the present disclosure are activated by reaction with high salinity environments (i.e. divalent cations) at alkaline pH, and result in the formation of a semi-solid lubricant or activated grease within the drilling fluid that adheres to downhole surfaces (e.g. tools, equipment, rock, etc.) and substantially remains downhole during the drilling operation. This semi-solid lubricant or activated grease exhibits extremely high affinity to metal and rock surfaces.

The lubricant blends and procedures of the present disclosure have been found particularly suitable for drilling fluid systems comprising produced water or brine, NaCl and a threshold divalent cation concentration (e.g. at least 1000 mg/L). As shown in the examples herein, the lubricant blend and associated procedures have been successfully employed at lateral lengths between about 1500 m to about 4000 m, or more.

Surprisingly, at least when used in alkaline produced water or brines having high salinity, the lubricant blends are capable of achieving coefficient of friction values similar to oil-based systems. Advantageously, there is generally no foaming, no shaker screen binding, and no tool plugging, particularly when used in accordance with the procedures herein. Moreover, the lubricant blends are capable of: (i) eliminating requirement for a beads recovery unit (e.g. the lubricants herein significantly reduce or eliminate the need for mechanical lubricants, such as polymer beads), (ii) eliminating total depth (TD) lubricant pills, and (iii) eliminating the need to displace to oil-based mud to reach TD. According to the procedures herein, lubricant blend is added in a controlled fashion and optimum performance is generally observed at very low concentrations of lubricant blend, which can provide a significant cost savings.

Example 5a

A lubricant of the present disclosure comprising a 1:1 by weight ratio of vegetable oil and oleic acid, and a dispersant comprising a cationic fatty imidazoline ethyl-sulfate quaternary, namely TOA 80DQ, was tested in field. Main hole section was drilled from around 2200 m to around 5000 m with 1150 kg/m$^3$ NaCl.

Figure 2:
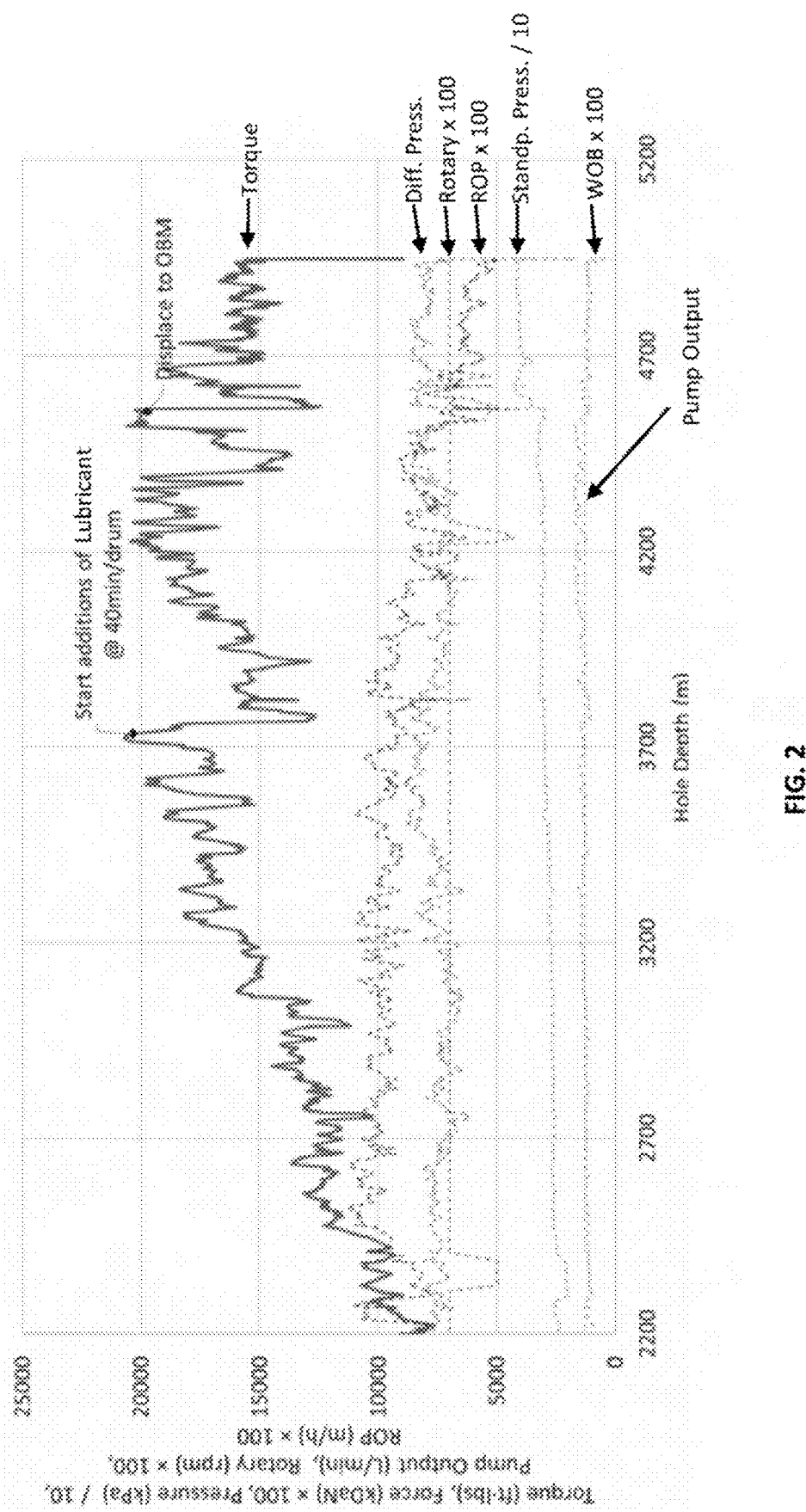
FIG. 2 is graph showing data from a drilling operation, including change in conditions upon addition of an exemplary lubricant of the present disclosure.

When torque on the drill pipe reached about 20,000 ft/lbs, the lubricant was delivered downhole at a rate of about 40 min/drum (1 drum=about 200 L of lubricant). Torque dropped almost immediately to <13,000 ft/lbs, which was a comparable drop in torque as observed after displacement to oil-based mud (OBM). A graph showing characteristics of the drilling operation is shown in FIG. 2.

Example 5b

A lubricant of the present disclosure comprising a 1:1 by weight ratio of vegetable oil and oleic acid, and a dispersant comprising a cationic fatty imidazoline ethyl-sulfate quaternary, namely TOA 80DQ, was tested in field. Main hole section was drilled from around 4000 m to around 6280 m with 1250 kg/m$^3$ CaCl$_2$ brine.

Figure 3:
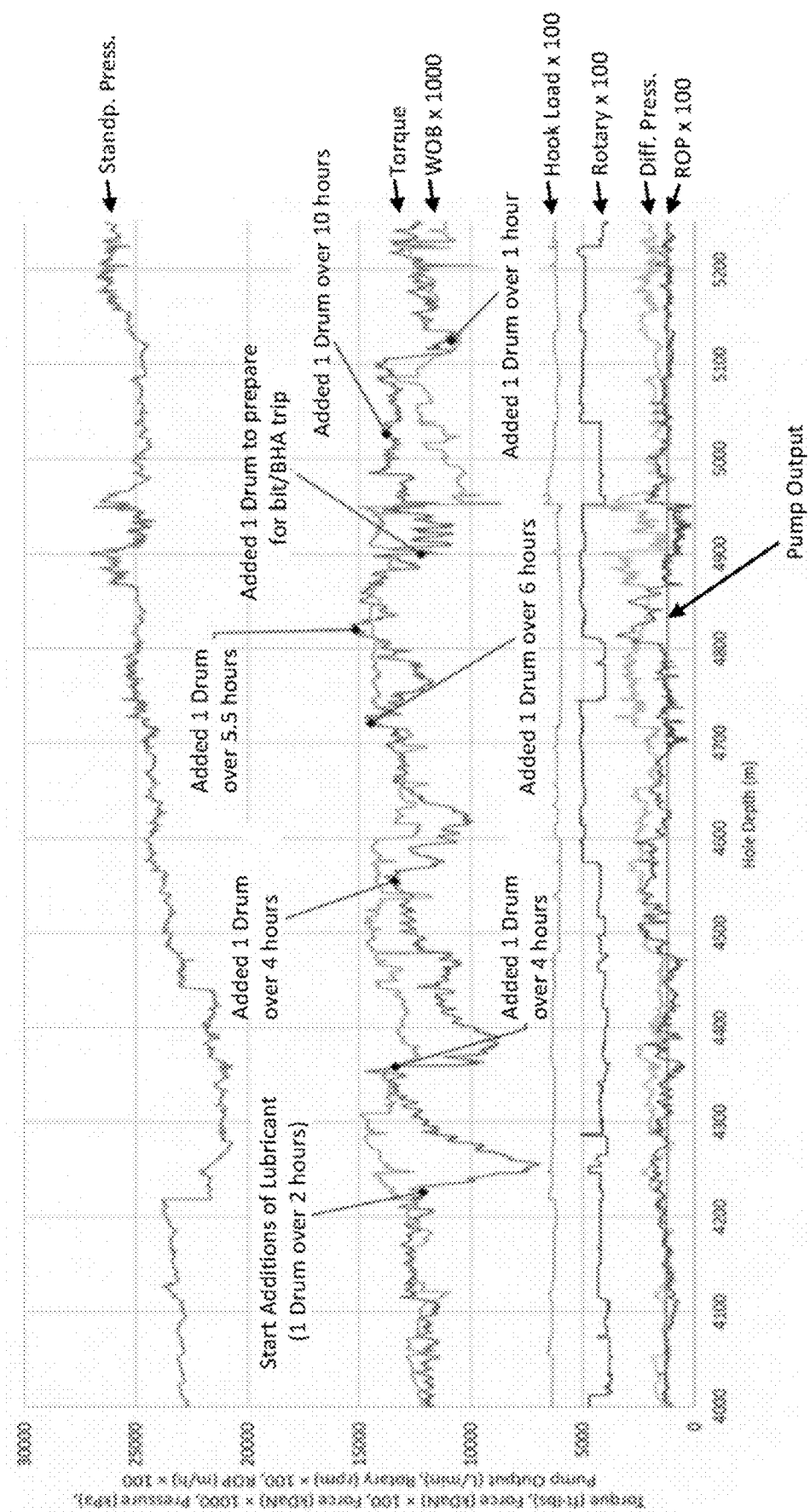
FIG. 3 is graph showing data from a drilling operation (4000 m to 5250 m), including change in conditions upon various additions of an exemplary lubricant of the present disclosure.
Figure 4:
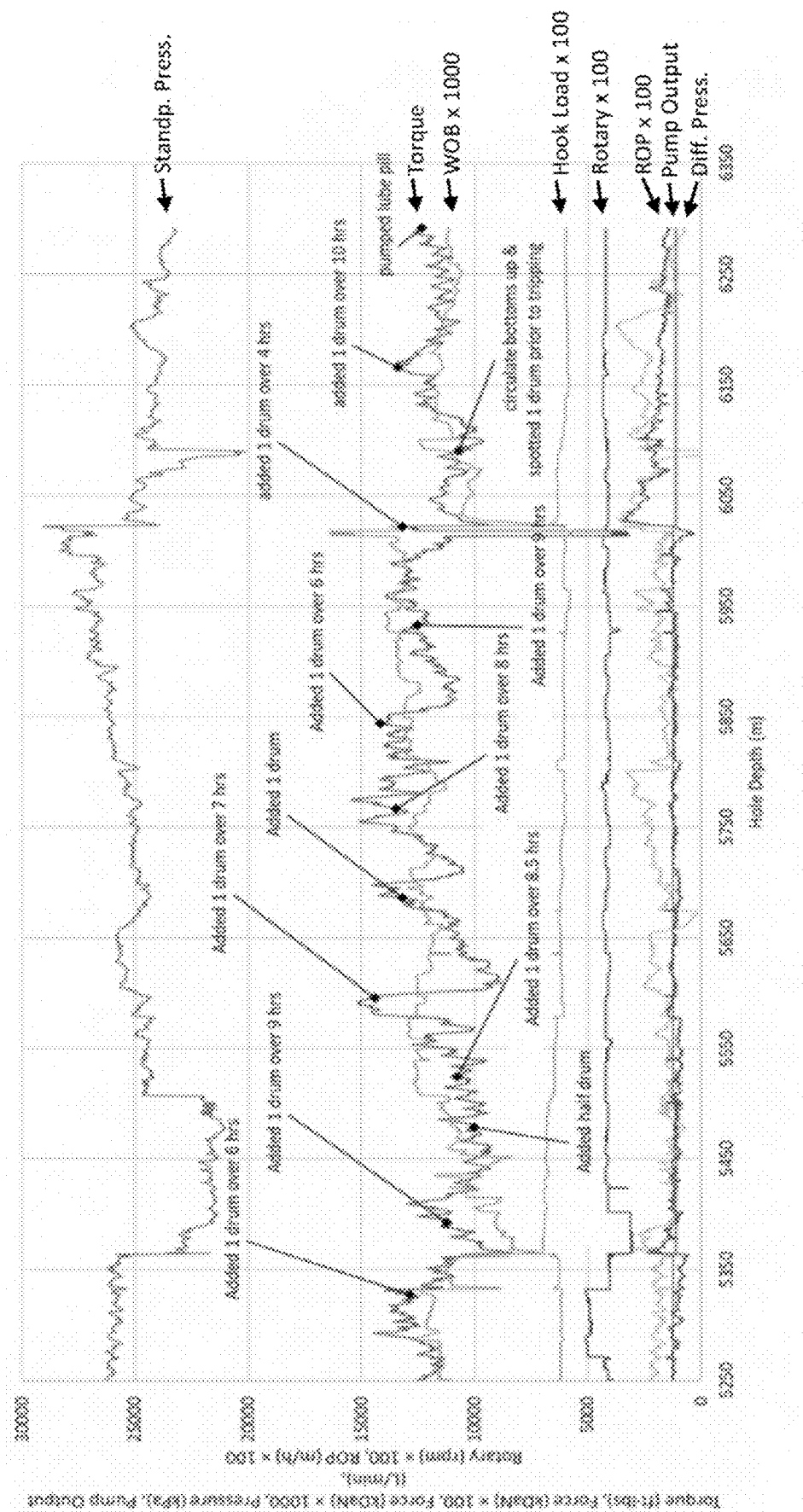
FIG. 4 is a graph showing further data for the drilling operation of FIG. 3 (5250 m to 6280 m), including change in conditions upon various additions of an exemplary lubricant of the present disclosure.

The lubricant was added at various depths as follows: Started addition of lubricant at 4226 m at 1 drum over 2 hours; 4359 m added 1 drum over 4 hours; 4555 m added 1 drum over 4 hours; 4721 m added 1 drum over 6 hours; 4820 m added 1 drum over 5.5 hours; 4900 m added 1 drum to prepare for bit/BHA trip; 5026 m added 1 drum over 10 hours; 5125 m added 1 drum over 1 hour; 5327 m added 1 drum over 6 hours; 5392 m added 1 drum over 9 hours; 5479 m added half drum; 5524 m added 1 drum over 8.5 hours; 5596 m added 1 drum over 7 hours; 5686 m added 1 drum; 5767 m added 1 drum over 8 hours; 5844 m added 1 drum over 6 hours; 5933 m added 1 drum over 9 hours; 6022 m added 1 drum over 4 hours; 6090 m circulated bottoms up & spotted 1 drum prior to tripping; 6166 m added 1 drum over 10 hours; and 6291 m pumped lube pill. Graphs showing characteristics of the drilling operation are shown in FIG. 3 (4000 m to 5250 m) and FIG. 4 (5250 m to 6280 m).

The field trial demonstrated the ability to maintain low torque for the entire lateral with a lubricant blend of the present disclosure. Moreover, there is a significant cost savings over conventional lubricants.

Example 5c

A lubricant of the present disclosure comprising about 95% by weight fatty acids (>60% oleic acid) and a dispersant comprising a cationic fatty imidazoline ethyl-sulfate quaternary, namely TOA 80DQ, was tested in field.

Figure 5:
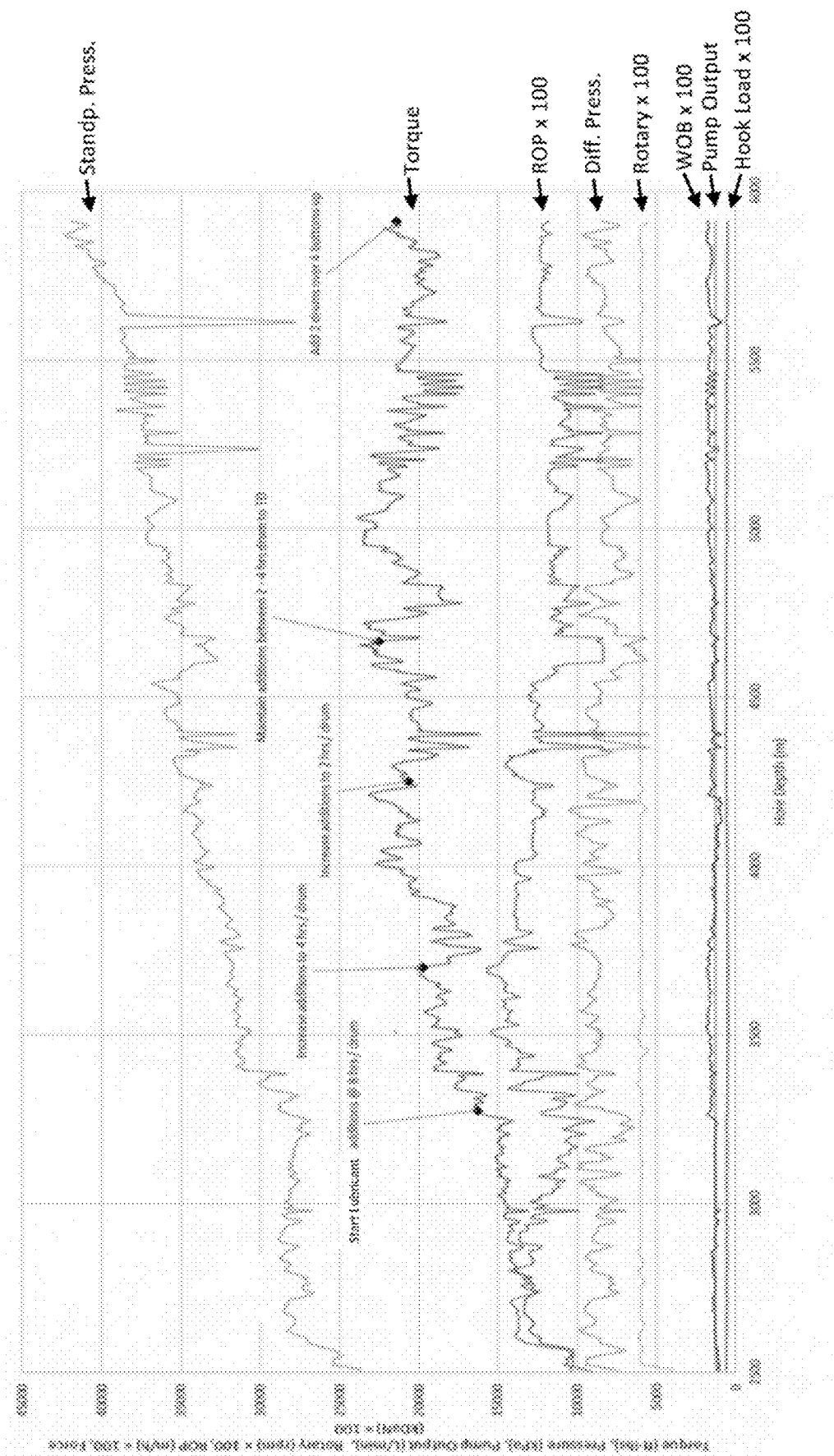
FIG. 5 is graph showing data from a drilling operation, including change in conditions upon various additions of an exemplary lubricant of the present disclosure.

Main hole interval was drilled from 2268 m to 5910 m with 1330 kg/m$^3$ CaCl$_2$ brine. The heel was at about 2510 m and drilled lateral from that point. Torque and drag analysis began at 2500 m or ~90° inclination. The following observations are from this depth. The average rate of penetration (ROP) was 119.85 m/hr. Average pump rate was 1.3 m$^3$/min. Average weight on bit (WOB) was 14,800 daN. Torque was maintained between about 12,000 and about 23,500 ft/lbs, average torque throughout the lateral was 18,900 ft/lbs. A graph showing characteristics of the drilling operation is shown in FIG. 5.

The lubricant was started over 8 hrs/drum from 3275 m with a torque of about 16,000 ft/lbs. Torque continued to climb to 19,600 ft/lbs and additions of lubricant were increased to 4 hrs/drum. Torque initially reduced to 16,000 ft/lbs before climbing to 23,500 ft/lbs. Increased additions of lubricant to 2 hrs/drum at 4212 m resulted in a decrease in torque to 16,200 ft/lbs. From 4653 m, lubricant was added at 2-4 hr a drum with torque maintained from 17,500-23,500 ft/lbs. At total depth (TD) of 5910 m, 4 drums of lubricant were added over 4 bottoms up. Torque reduced from 22,800 ft/lbs and stayed flat at about 5,000 ft/lbs.

Surprisingly, using a lubricant of the present disclosure allowed the operator to drill all the way to TD and run casing with brine in the hole. This was the first time the operator had been able to achieve this advantageous result using a brine-based drilling fluid. It was not necessary to displace the brine-based drilling fluid with oil-based mud (OBM). The off-bottom torque data demonstrated improved performance (i.e. reduced torque; approx. 5,000 ft/lbs) using a lubricant of the present disclosure (date not shown).

Example 5d

A lubricant of the present disclosure comprising about 95% by weight fatty acids (>60% oleic acid) and a dispersant comprising a cationic fatty imidazoline ethyl-sulfate quaternary, namely TOA 80DQ, was tested in field.

Figure 6:
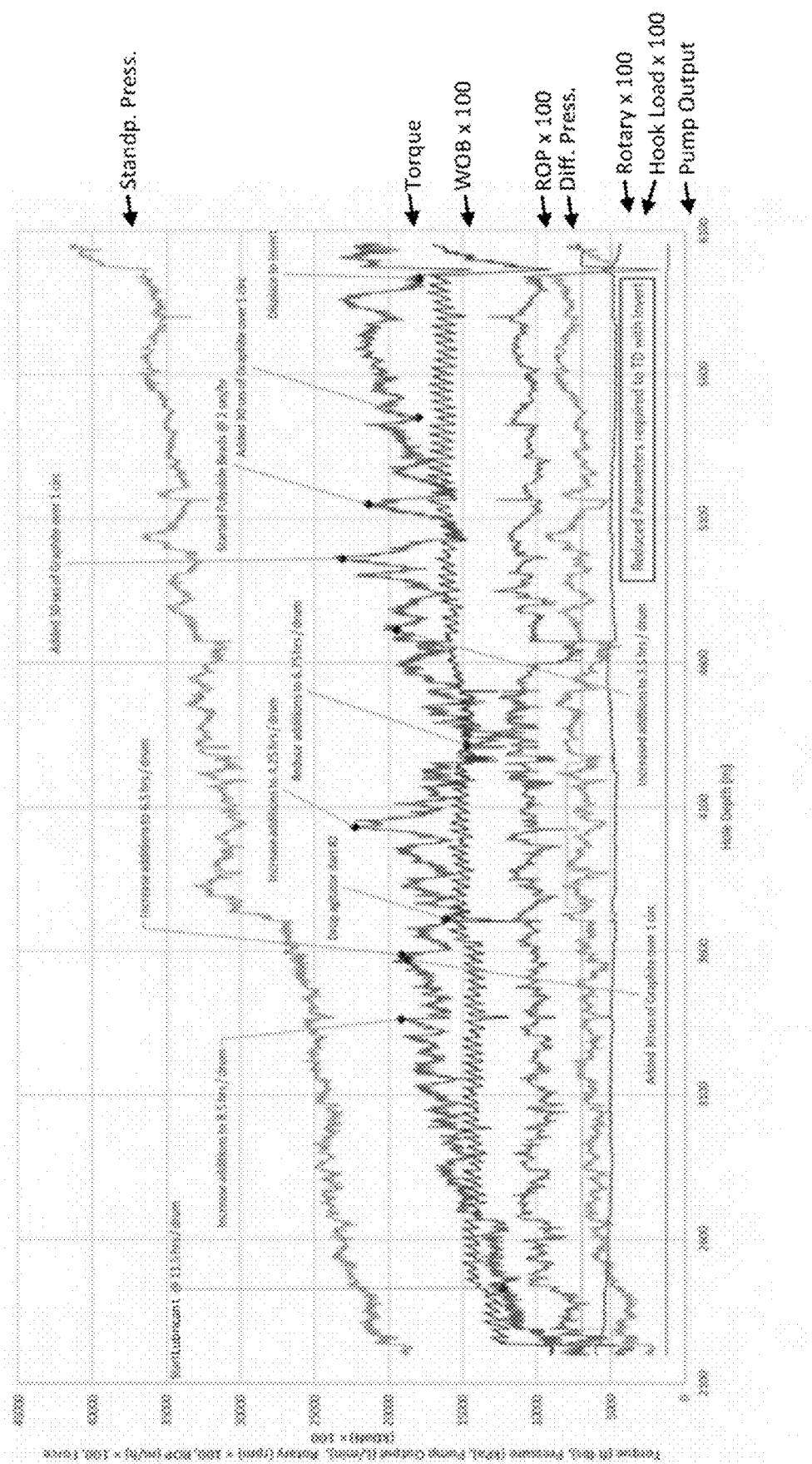
FIG. 6 is graph showing data from a drilling operation, including change in conditions upon various additions of an exemplary lubricant of the present disclosure.

Lateral interval was drilled from about 2210 m to about 5940 m with a produced water system, displaced to invert and drilled to TD at 6053 m. The average ROP was 100 m/hr. Average pump rate was 1.25 m$^3$/min. Average WOB was 15,000 daN. Torque was maintained between about 15,000 and about 23,000 ft/lbs, average torque throughout the lateral was 17,800 ft/lbs. A graph showing characteristics of the drilling operation is shown in FIG. 6.

Initially, the lubricant was maintained at 11.5 hrs/drum from 2430 m to 3360 m with torque being maintained between 12,300-19,000 ft/lbs. Once torque had reached 19,000 ft/lbs, additions of lubricant were increased to 8.5 hrs/drum maintaining torque at 16,000-20,000 ft/lbs. Once torque reached 20,000 ft/lbs, lubricant additions were increased to 4.25-6.75 hrs/drum, torque was maintained from 13,000-22,000 ft/lbs. Lubricant additions were increased at 4714 m to 3.5 hrs/drum and maintained until 5935 m, torque was maintained at 15,300-23,500 ft/lbs averaging 19,300 ft/lbs. Displaced to invert at 5935 m. Drilled to 6053 m with invert with an average torque of 21,000 ft/lbs, reduced drilling parameters in RPM, ROP and WOB. There was only a modest reduction in torque at switch to invert, and even this was predominantly due to drop on ROP. This same feature was observed in other field trials involving a switch to invert.

Example 5e

A field trial comparison was run between a conventional lubricant and lubricants of the present disclosure. The lubricant of the present disclosure that was used was: (i) a first lubricant comprising a 1:1 by weight ratio of vegetable oil and oleic acid, and a dispersant comprising a cationic fatty imidazoline ethyl-sulfate quaternary, namely TOA 80DQ; and (ii) a second lubricant comprising about 95% by weight fatty acids (>60% oleic acid) and a dispersant comprising a cationic fatty imidazoline ethyl-sulfate quaternary, namely TOA 80DQ.

Figure 7:
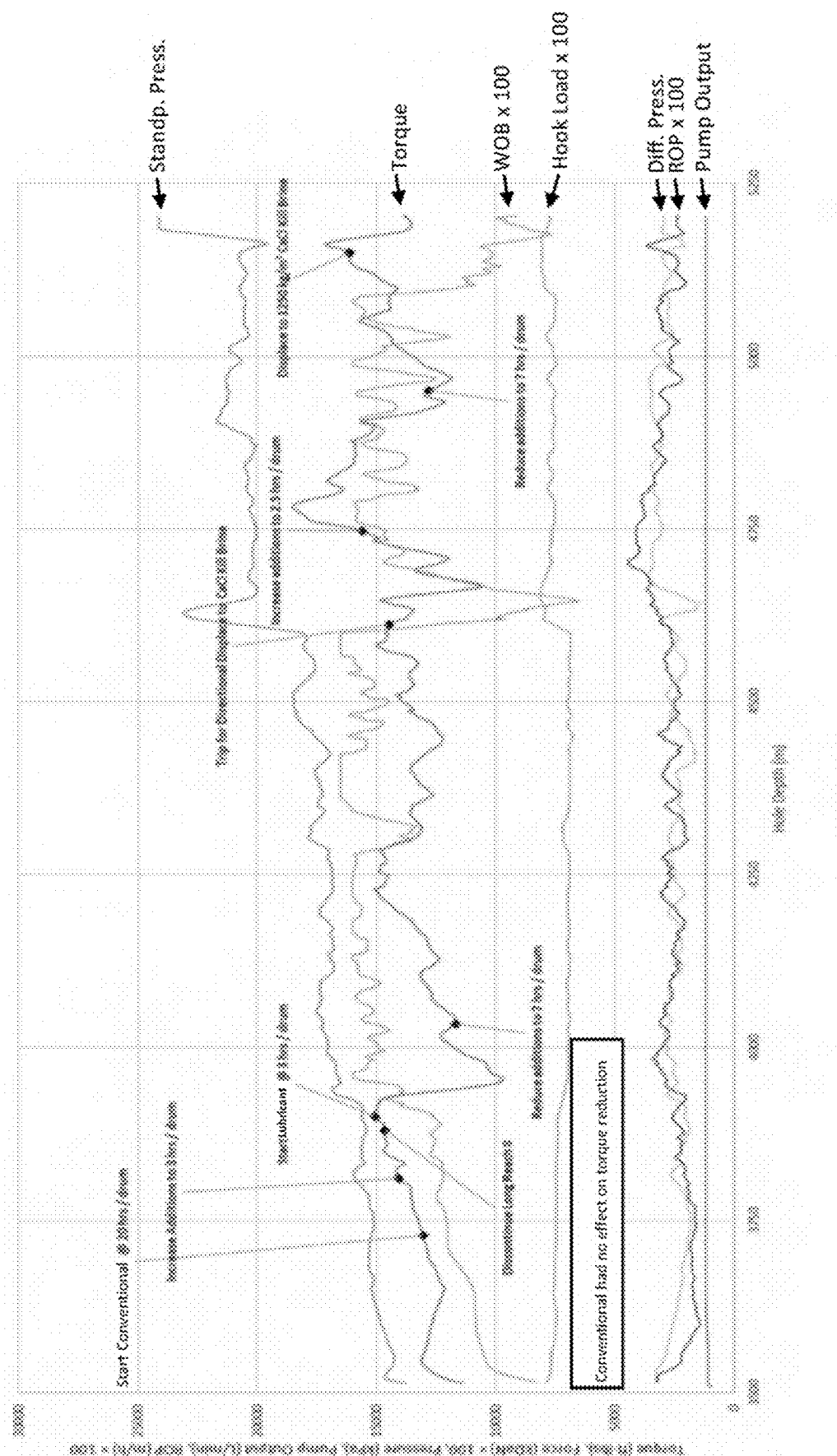
FIG. 7 is graph showing data from a drilling operation comparing the use of a conventional lubricant and a lubricant of the present disclosure.

Main hole interval was drilled from 3503 m to 5150 m with a produced water system. The well was displaced at 5150 m to 1250 kg/m$^3$ density kill brine (CaCl$_2$) and was drilled to TD at 5205. The heel was at about 3818 m and drilled lateral from that point. Torque and drag analysis began at 3507 m or ~30° inclination, all following comments are from this depth. The average ROP was 27.6 m/hr. Average pump rate was 1.2 m$^3$/min. Average WOB was 14,000 daN. Torque was maintained between about 10,000 and about 18,000 ft/lbs, average torque throughout the lateral was 13,800 ft/lbs. A graph showing characteristics of the drilling operation is shown in FIG. 7.

Initially, conventional lubricant was mixed at 20 hrs/drum from 3731 m with a torque of ~13,000 ft/lbs. Torque continued to climb to 14,000 and additions of conventional lubricant were increased to 3 hrs/drum, torque continued to climb to 15,000 ft/lbs. Additions of the first lubricant of the present disclosure were started at 3 hrs/drum at 3900 m and a decrease in torque from 15,000 to 10,000 ft/lbs was quickly observed. This lubricant was switched after a short depth to the second lubricant of the present disclosure. Torque was maintained from 10,000-15,000 ft/lbs. Torque climbed to 15,000 ft/lbs and additions of the lubricant of the present disclosure were increased to 2.5 hrs/drum. Torque peaked at 18,000 ft/lbs but was deceased to below 15,000 ft/lbs by 4900 m. Reduced additions of lubricant of the present disclosure, to 7 hrs/drum from 4952 m-5205 m, maintained an average torque of 14,400 ft/lbs.

Overall, the conventional lubricant was ineffective in the produced water system, whereas the lubricant of the present disclosure worked well.

Example 5f

A lubricant of the present disclosure comprising a 1:1 by weight ratio of vegetable oil and oleic acid, and a dispersant comprising a cationic fatty imidazoline ethyl-sulfate quaternary, namely TOA 80DQ, was tested in field.

Figure 8:
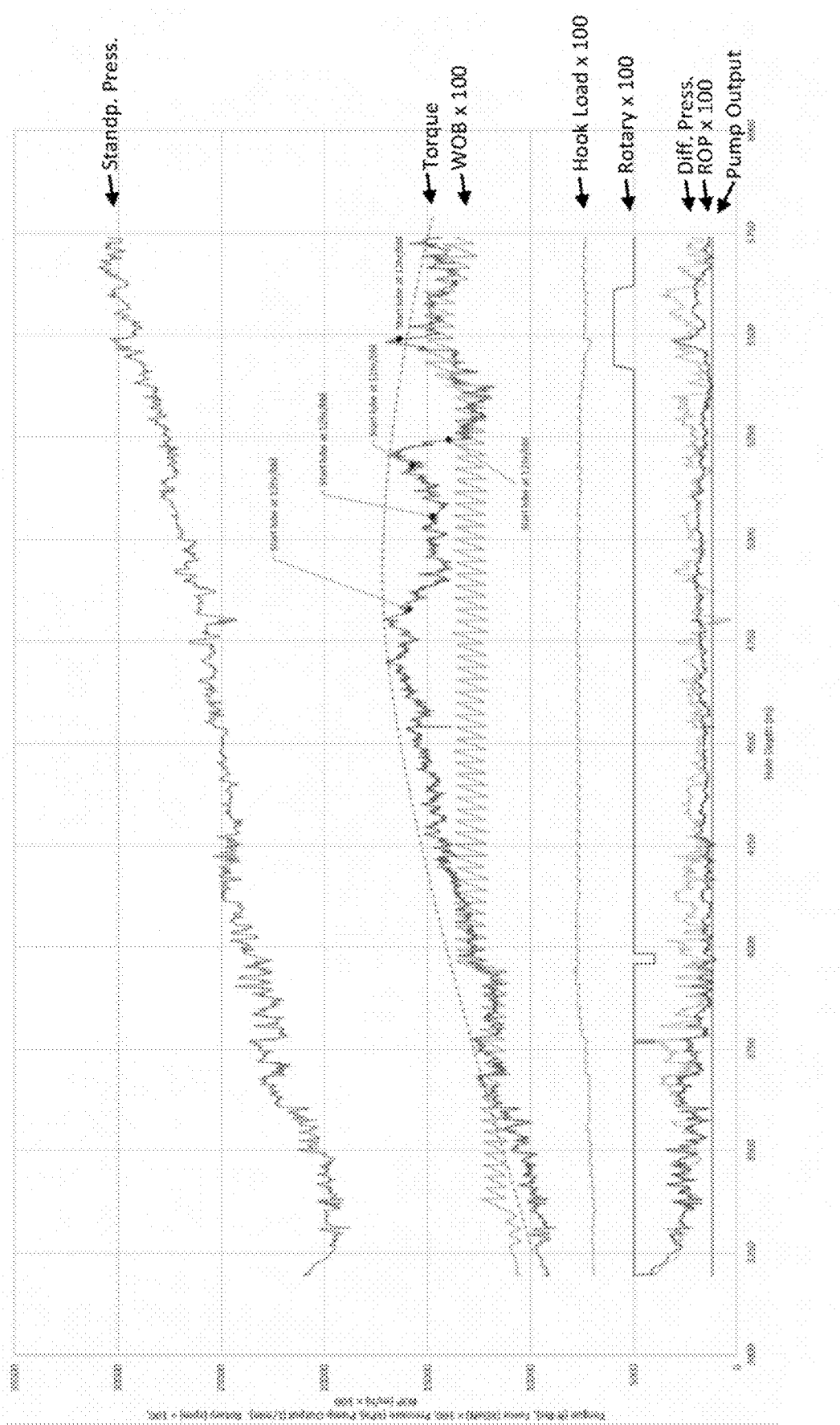
FIG. 8 is graph showing data from a drilling operation, including change in conditions upon various additions of an exemplary lubricant of the present disclosure.

Main hole interval was drilled from about 3200 m to 5750 m with 1280-1330 kg/m$^3$ CaCl$_2$ brine. Addition of lubricant of the present disclosure was found to level-out and reduce torque levels. A graph showing characteristics of the drilling operation is shown in FIG. 8.

A number of additional field tests were run under similar operating conditions, using different concentrations of lubricant and similar results were achieved (data not shown). The addition of lubricant of the present disclosure was found to consistently level out and reduce torque levels.

Example 5g

A lubricant of the present disclosure comprising about 95% by weight fatty acids (>60% oleic acid) and a dispersant comprising a cationic fatty imidazoline ethyl-sulfate quaternary, namely TOA 80DQ, was tested in field.

Figure 9:
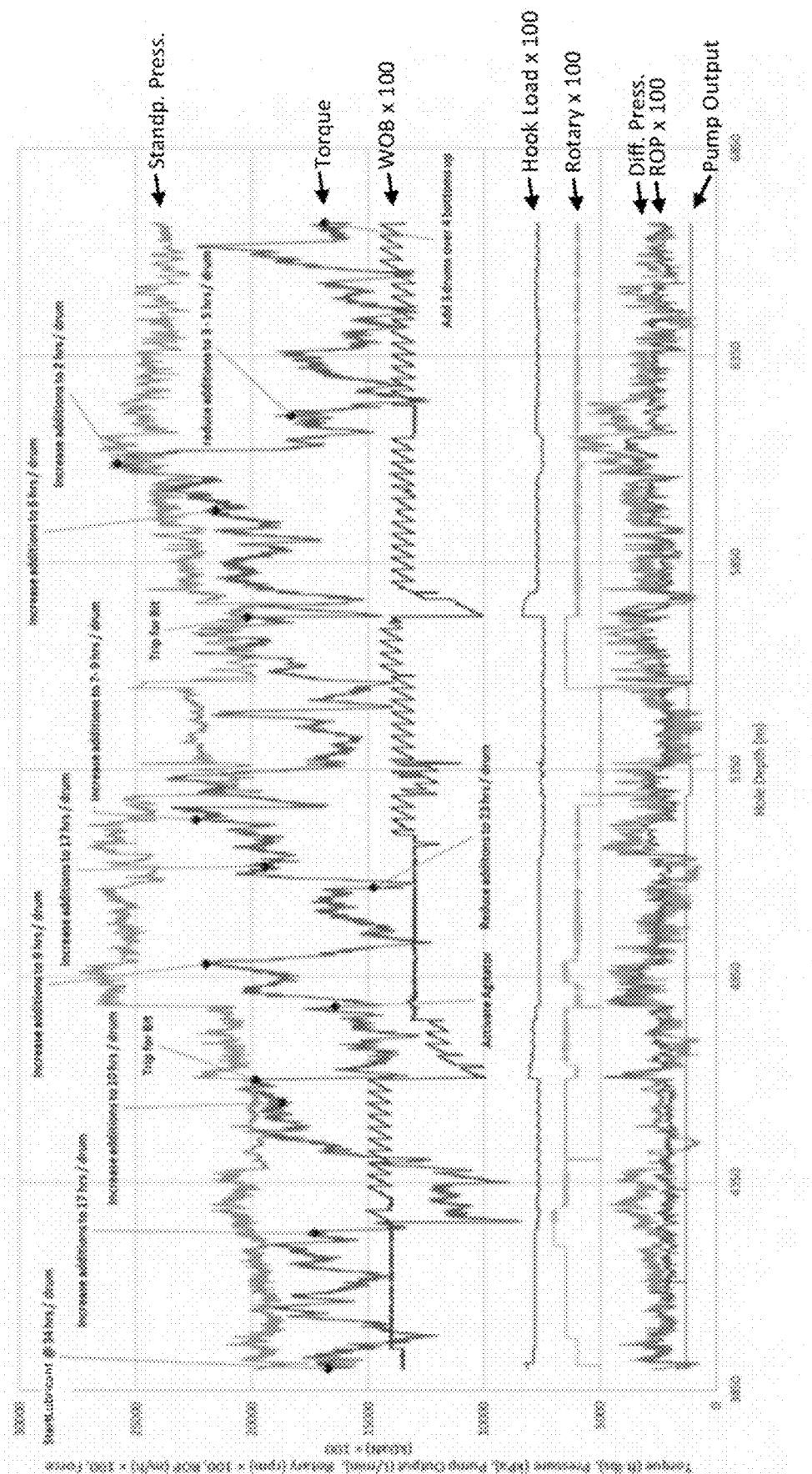
FIG. 9 is graph showing data from a drilling operation, including change in conditions upon various additions of an exemplary lubricant of the present disclosure.

Main hole section was drilled from 3495 m to 6670 m with 1150 kg/m$^3$ produced water system. The heel was at about 3890 m and drilled lateral from that point. Torque and drag analysis began at 3900 m or ~90° inclination, all following comments are from this depth. The average ROP was 23.59 m/hr. Average pump rate was 1.21 m$^3$/min. Average WOB was 13,500 daN. Torque was maintained between about 8,500 and about 26,000 ft/lbs, average torque throughout the lateral was 17,300 ft/lbs. A graph showing characteristics of the drilling operation is shown in FIG. 9.

Figure 10:
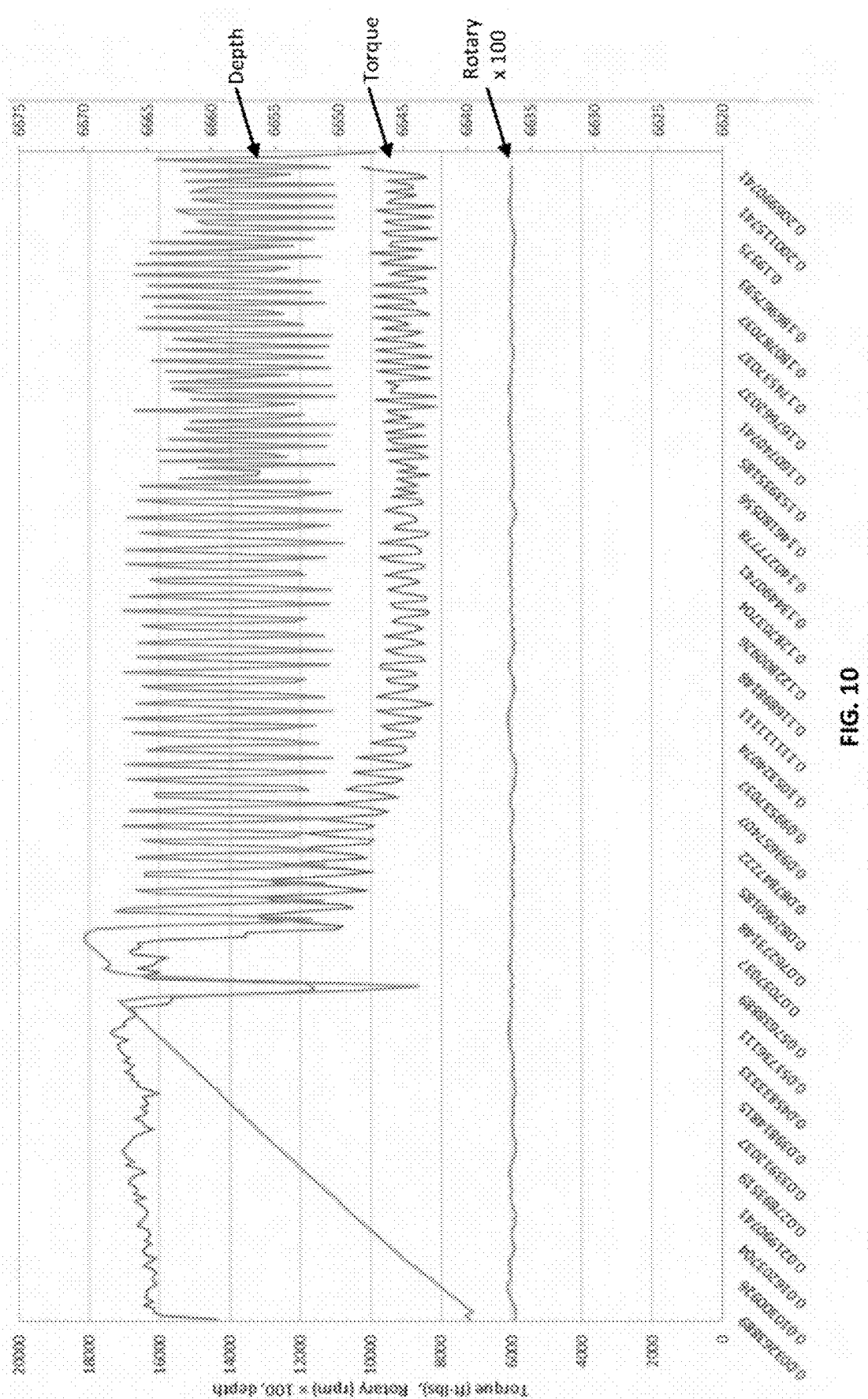
FIG. 10 is graph showing off-bottom data for the drilling operation of FIG. 9.

Lubricant was started over 34 hrs/drum from 3900 m with a torque of about 17,000 ft/lbs. Increased additions to 17 hrs/drum with torque dropping to 8,500 ft/lbs. Torque started to climb to 20,000 ft/lbs and additions of lubricant were increased to 10 hrs/drum. Trip for bit at 4600 m. Torque spiked to 22,000 ft/lbs at 4880 m, increased lubricant to 9 hrs/drum. Torque reduced to 12,300 ft/lbs, reducing additions of lubricant to 23 hrs/drum. Lubricant additions added between 7-9 hrs/drum maintaining torque between 14,000-24,000 ft/lbs. Tripped for bit at 5718 m. Increased additions to 6 hrs/drum with torque continuing to climb to 26,000 ft/lbs. Additions were increased to 2 hrs/drum to reduce torque to 12,000 ft/lbs. Additions were then maintained between 3-5 hrs/drum with average torque of ~16,000 ft/lbs. At TD (6670 m) added 3 drums of lubricant over 4 bottoms up. Off-bottom torque reduced from 18,000 ft/lbs and flat lined at 9,000 ft/lbs (data not shown). Off-bottom torque data demonstrates performance of lubricant without torque due to drilling (see FIG. 10).

Example 5h

A lubricant of the present disclosure comprising about 95% by weight fatty acids (>60% oleic acid) and a dispersant comprising a cationic fatty imidazoline ethyl-sulfate quaternary, namely TOA 80DQ, was tested in field.

Figure 11:
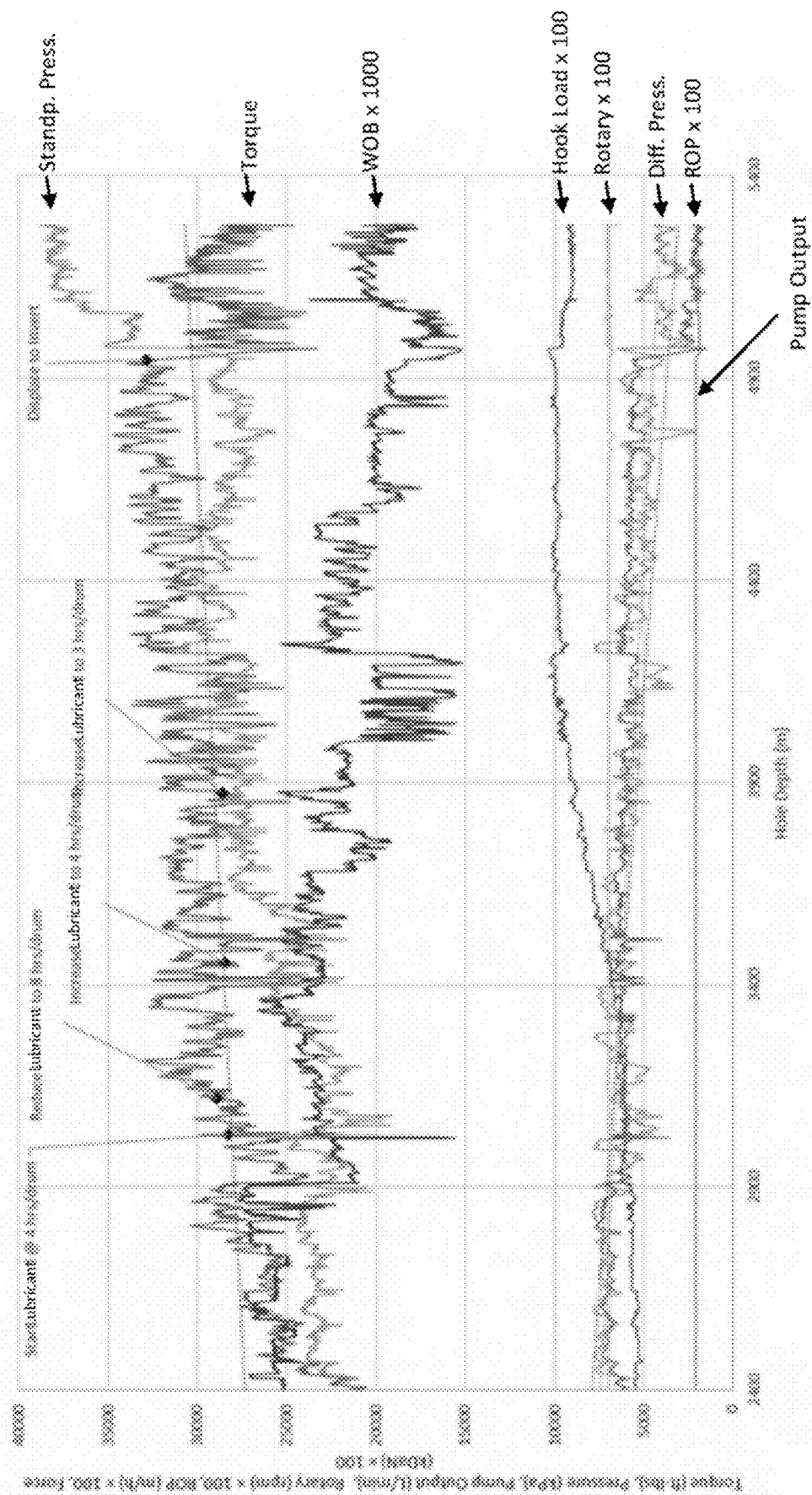
FIG. 11 is graph showing data from a drilling operation (2400 m to 5300 m), including change in conditions upon various additions of an exemplary lubricant of the present disclosure.
Figure 12:
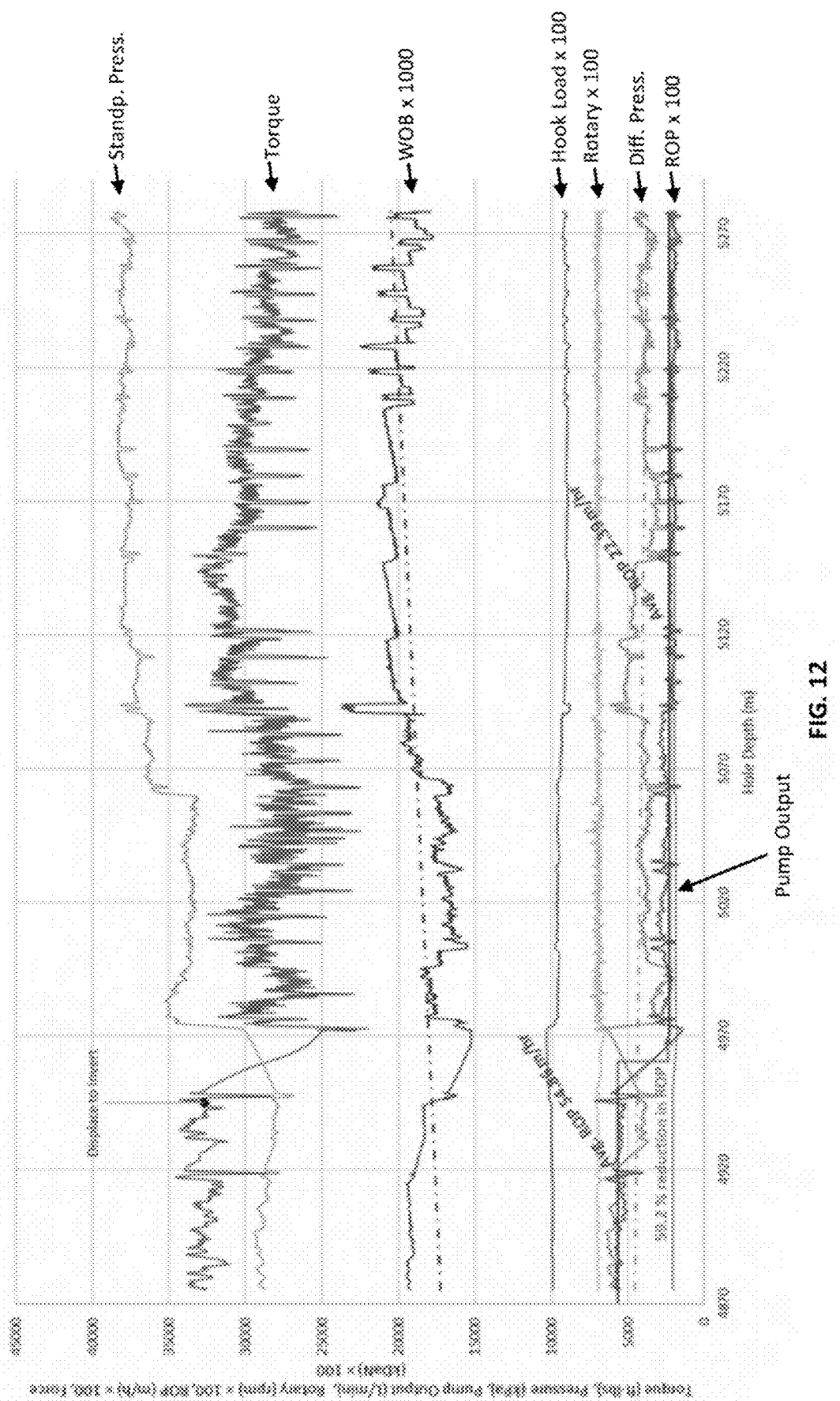
FIG. 12 is a graph showing expanded data for the drilling operation of FIG. 11 (4870 m to 5300 m), including change in conditions upon various additions of an exemplary lubricant of the present disclosure.

Main hole interval was drilled from about 2400 m to 5300 m with a CaCl$_2$ brine that was displacement to invert (oil-based mud; OBM) at around 4950 m. Addition of lubricant of the present disclosure was found to maintain torque levels within an acceptable range. At the switch to invert, there was only a modest reduction in torque despite a significant drop in ROP (i.e. 59.2% reduction in ROP based on averages). Thus, the lubricant of the present disclosure used in a produced water provides as good, if not better, lubricity than OBM. Graphs showing characteristics of the drilling operation are shown in FIG. 11 (2400 m to 5300 m) and FIG. 12 (4870 m to 5300 m).

From the field trials described in this Example 5, it has been found that brine-based drilling fluids prepared using the lubricant blends of the present disclosure exhibit ultra-high performance, including marked improvements over a conventional lubricant. The lubricant blend of the present disclosure is not only tolerant to the alkaline pH and high salinity of the produced water and brines, but is activated by components within these fluids to produce an effective semi-solid lubricant within such brine-based drilling fluids. Some observations include (i) improved torque reduction as compared to conventional lubricant, (ii) lack of lubricant returning to surface, (iii) reduction or elimination of mechanical lubricants and bead recovery, (iv) ability to achieve coefficients of friction similar to or even better than oil-based systems, (v) no forming, (vi) no shaker screen binding, and (vii) no tool plugging.

Example 6

A number of field trials were performed to evaluate the efficiency of use and cost in employing a lubricant of the present disclosure.

Two laterals were drilled using a lubricant of the present disclosure (LOPD #1 and LOPD #2) comprising about 95% by weight fatty acids (>60% oleic acid) and a dispersant comprising a cationic fatty imidazoline ethyl-sulfate quaternary, namely TOA 80DQ, was tested in field. Two other laterals were drilled in wells having similar profiles and by adopting similar drilling parameters, but using a conventional lubricant. The drilling fluid used in all four of the wells was a CaCl2 brine (1215-1300 kg/m$^3$). None of the wells were switched to OBM.

Figure 13:
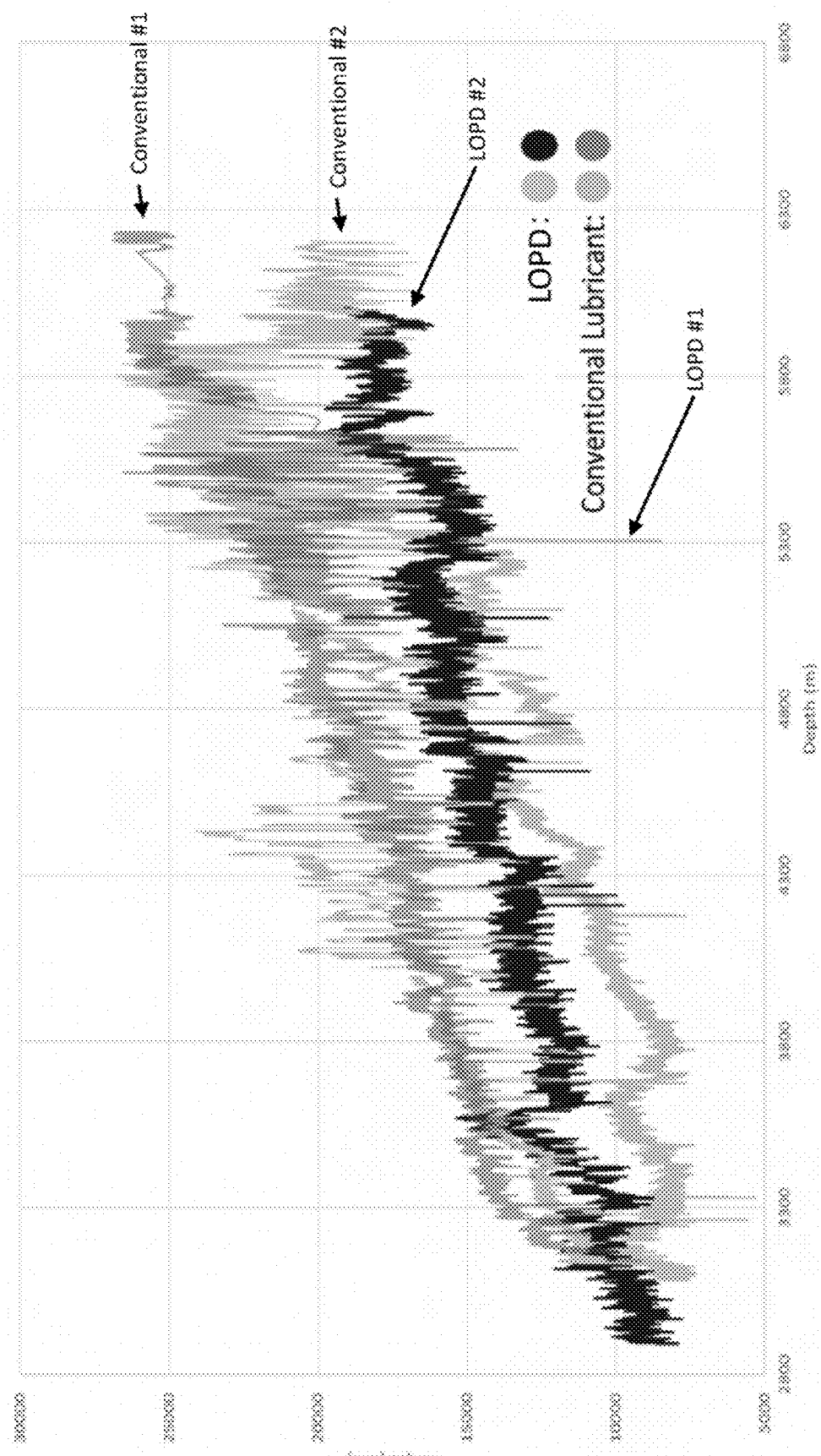
FIG. 13 is graph showing comparison torque data for four similar drilling operations, two of which used a conventional lubricant (Conventional #1 and #2) and two of which used a lubricant of the present disclosure (LOPD #1 and #2).

The results are shown in FIG. 13. Significantly lower torque values were observed for the two wells in which lubricant of the present disclosure (LOPD) was used (i.e. about 25% reduction for entire lateral). The LOPD #1 well was shorter than the others. Notably, torque on the Conventional #1 well drops significantly at about 5800 m, but this was due to drilling parameters being changed (i.e. lower ROP) to avoid a bit trip.

The table below shows economics of drilling with the conventional lubricant:

|  | Total Well Length (m) | Total Beads (units) | Total Lubricant (units) |
| --- | --- | --- | --- |
| Conventional Lubricant (Well 1) | 6233 | 197 | 17 |
| Conventional Lubricant (Well 2) | 6205 | 192 | 29 |
| Average | 6219 | 195 | 23 |
| Average Cost/Meter (Lubricant + Beads) |  | $10.91 |  |

The table below shows improved economics of drilling with the lubricant of the present disclosure:

|  | Total Well Length (m) | Total Beads (units) | Total Lubricant (units) |
| --- | --- | --- | --- |
| LOPD #1 | 5480 | 65 | 16 |
| LOPD #2 | 6005 | 63 | 9 |
| Average | 5743 | 64 | 13 |
| Average Cost/Meter (Lubricant + Beads) |  | $6.30 |  |

Thus, the lubricant of the present disclosure achieved both lower torque and lower cost.

Several other comparisons have been conducted at different well sites by different operators. In each case, the lubricant and processes in accordance with the present disclosure achieved lower costs to drill the lateral, with the torque being at least within the same range if not better than the conventional lubricant (data not shown).

In the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be referenced herein, the definitions that are consistent with this specification should be adopted.

Many obvious variations of the embodiments set out herein will suggest themselves to those skilled in the art in light of the present disclosure. Such obvious variations are within the full intended scope of the appended claims.

The invention claimed is:

1. A method for increasing the lubricity of a brine-based drilling fluid having an alkaline pH, the method comprising:
   providing a produced water or a brine having a threshold divalent cation concentration and an alkaline pH;
   adding to the produced water or brine at least one source of free fatty acids; and
   adding to the produced water or brine a dispersant, wherein the dispersant comprises an imidazoline.

2. The method of claim 1, wherein the step of adding the at least one source of fatty acids to the produced water or brine is at an amount and/or rate sufficient to induce formation of a semi-solid lubricant within the brine-based drilling fluid.

3. The method of claim 1, wherein the threshold divalent cation concentration is at least 1000 mg/L.

4. The method of claim 1, wherein the threshold divalent cation concentration comprises a threshold magnesium concentration is at least 500 mg/L.

5. The method of claim 4, wherein the threshold magnesium concentration is at least 1000 mg/L.

6. The method of claim 1, wherein the step of providing the produced water or brine comprises a step of increasing the pH to above at least 7.0.

7. The method of claim 1, wherein the pH of the produced water or brine is at least 9.0.

8. The method of claim 7, wherein the pH of the produced water or brine is at least 10.5.

9. The method of claim 1, wherein the threshold divalent cation concentration comprises a threshold calcium concentration of at least 500 mg/L.

10. The method of claim 9, wherein the threshold calcium concentration is at least 1000 mg/L.

11. The method of claim 1, wherein the produced water or brine is brought to or above the threshold divalent cation concentration by adding magnesium and/or calcium.

12. The method of claim 1, wherein the at least one source of free fatty acids is a mixture of a vegetable oil and one or more fatty acids.

13. The method of claim 12, wherein the mixture is the vegetable oil and oleic acid.

14. The method of claim 1, wherein the at least one source of free fatty acids comprises at least 60% by weight oleic acid.

15. The method of claim 1, wherein the dispersant comprises a fatty imidazoline ethyl-sulfate quaternary.

16. The method of claim 1, wherein the dispersant comprises or is 1:1 TOFA-AEEA imidazoline quaternized with diethylsulfate.

17. The method of claim 1, wherein the dispersant and the at least one source of free fatty acids are added to the produced water or brine together in a lubricant blend.

18. The method of claim 17, wherein the lubricant blend comprises:
    between about 40% and about 60% by weight vegetable oil;
    between about 40% and about 60% by weight oleic acid; and
    between about 0.1% and about 10% by weight fatty imidazoline ethyl-sulfate quaternary.

19. The method of claim 18, wherein the lubricant blend comprises:
    between about 45% and about 55% by weight canola oil;
    between about 45% and about 55% by weight oleic acid; and
    between about 0.5% and about 5% by weight 1:1 TOFA-AEEA imidazoline quaternized with diethylsulfate.

20. The method of claim 17, wherein the lubricant blend comprises:
    between about 60% and about 80% by weight oleic acid; and
    between about 0.1% and about 10% by weight fatty imidazoline ethyl-sulfate quaternary.

21. The method of claim 17, wherein the lubricant blend comprises:
    about 95% by weight fatty acids, the fatty acids comprising at least 60% by weight oleic acid; and
    about 5% by weight dispersant being 1:1 TOFA-AEEA imidazoline quaternized with diethylsulfate.

* * * * *